(12) United States Patent
Iwai

(10) Patent No.: US 10,040,371 B2
(45) Date of Patent: Aug. 7, 2018

(54) CHARGING SYSTEM AND PAIRING METHOD

(71) Applicant: TOYOTA JIDOSHA KABUSHIKI KAISHA, Toyota-shi, Aichi-ken (JP)

(72) Inventor: Atsushi Iwai, Tajimi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 205 days.

(21) Appl. No.: 14/914,194

(22) PCT Filed: Aug. 13, 2014

(86) PCT No.: PCT/IB2014/001513
§ 371 (c)(1),
(2) Date: Feb. 24, 2016

(87) PCT Pub. No.: WO2015/028857
PCT Pub. Date: Mar. 5, 2015

(65) Prior Publication Data
US 2016/0214496 A1    Jul. 28, 2016

(30) Foreign Application Priority Data
Aug. 26, 2013   (JP) ................ 2013-174601

(51) Int. Cl.
*H02J 7/00*   (2006.01)
*B60L 11/18*  (2006.01)

(52) U.S. Cl.
CPC ....... *B60L 11/1883* (2013.01); *B60L 11/1816* (2013.01); *B60L 11/1846* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ........................................................ H02J 7/00
USPC ........................................................ 320/106
See application file for complete search history.

(56) References Cited

U.S. PATENT DOCUMENTS

2013/0038272 A1   2/2013   Sagata
2013/0198551 A1   8/2013   Marlin et al.
(Continued)

FOREIGN PATENT DOCUMENTS

JP   2010-142096 A   6/2010
WO  2012/111127 A1   8/2012

*Primary Examiner* — Mohammed Alam
(74) *Attorney, Agent, or Firm* — Sughrue Mion, PLLC

(57) ABSTRACT

A charging system includes a vehicle (200) that receives electric power with which a storage battery (240) is charged, from an inlet (226), and a power feeding apparatus (100) that supplies the electric power to a power-feed-side connector (126) connected to the inlet (226). The power feeding apparatus (100) and the vehicle (200) share a temporary signal pattern given to a control signal, through communication via communication units (130, 270), separately from communication established by connection between the inlet (226) and the power-feed-side connector (126). The vehicle (200) specifies the power feeding apparatus (100) as a destination of wireless communication, as the apparatus connected to the inlet (226), based on matching of a temporary signal pattern detected from the control signal, with the shared temporary signal pattern.

11 Claims, 10 Drawing Sheets

(56) References Cited

U.S. PATENT DOCUMENTS

| | | | |
|---|---|---|---|
| 2014/0035522 A1 | 2/2014 | Oishi | |
| 2014/0306649 A1* | 10/2014 | Akiyoshi | H02J 7/025 |
| | | | 320/107 |
| 2015/0303730 A1* | 10/2015 | Hoda | H02J 5/005 |
| | | | 320/108 |
| 2016/0156213 A1* | 6/2016 | Yajima | H01M 10/623 |
| | | | 320/152 |
| 2016/0214496 A1* | 7/2016 | Iwai | B60L 11/1846 |

* cited by examiner

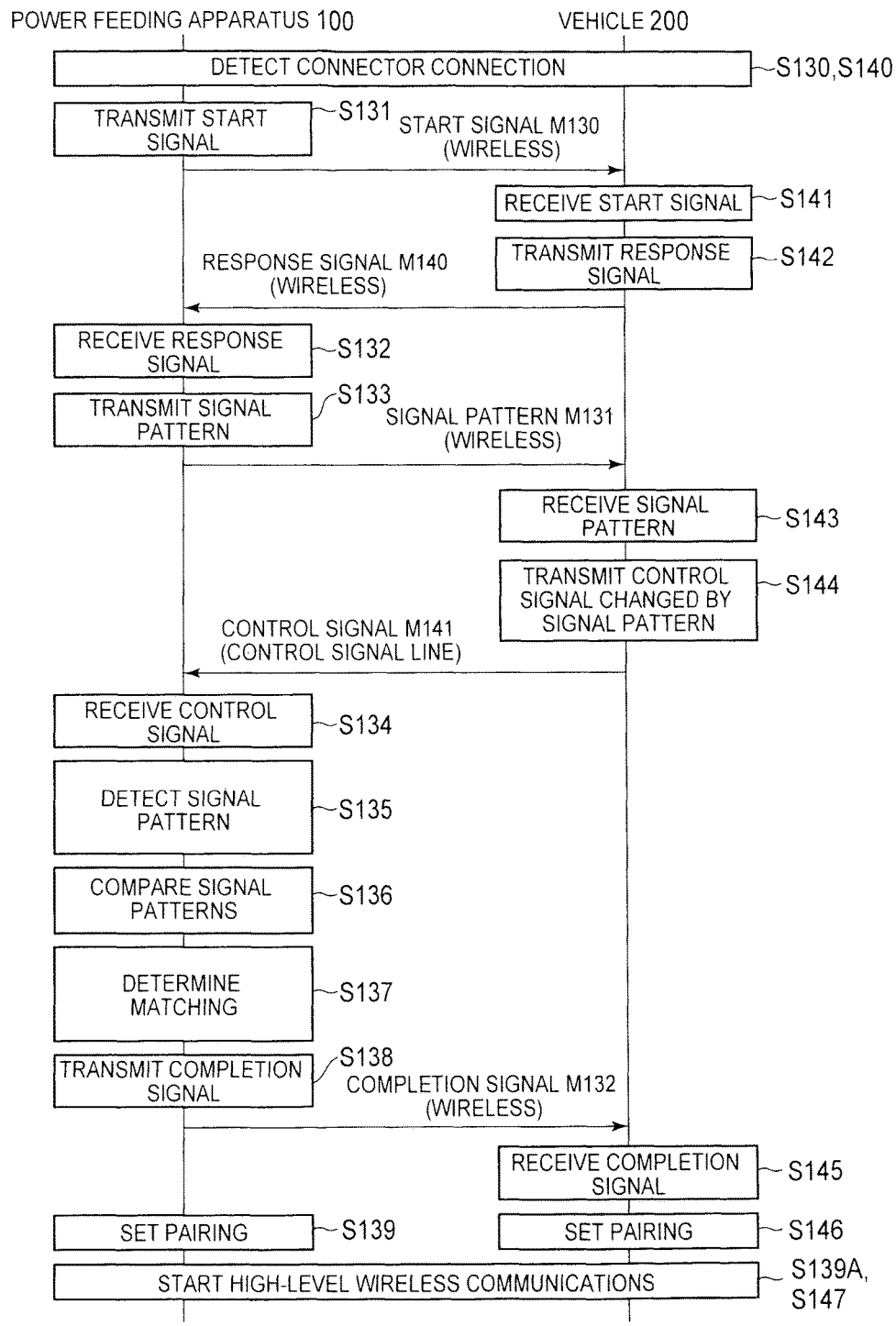

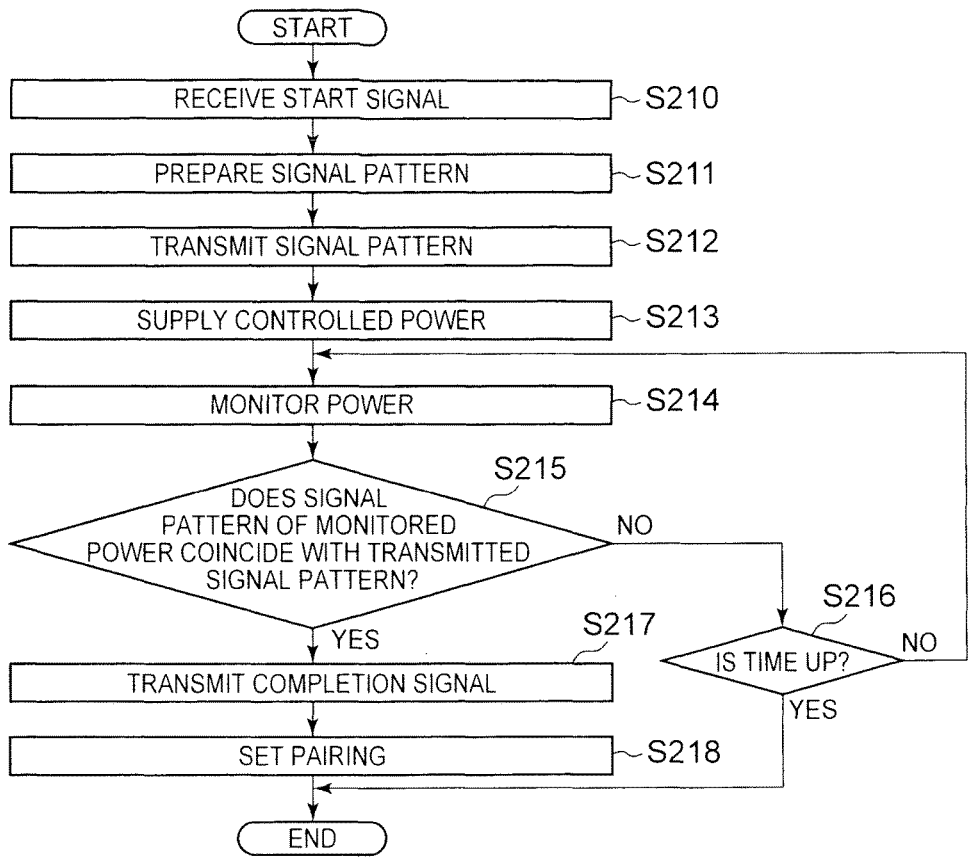
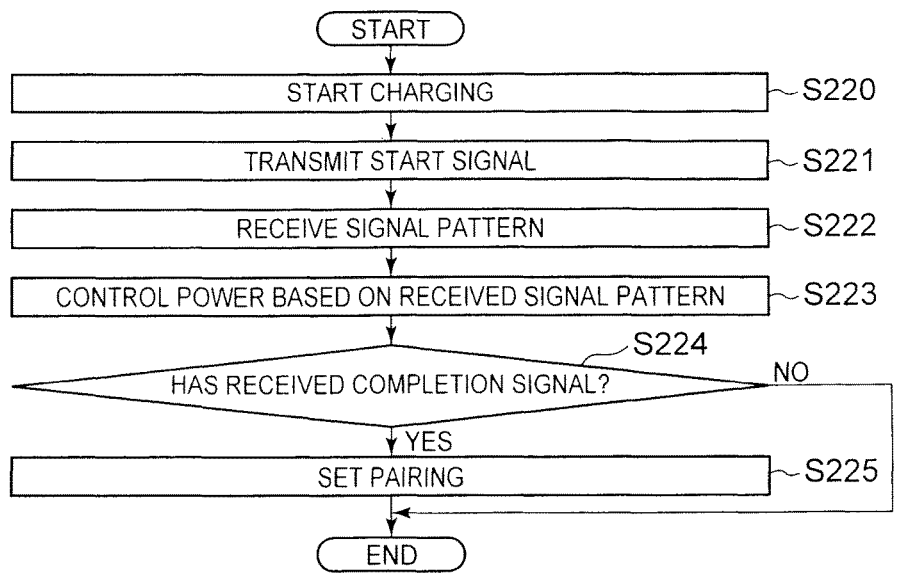

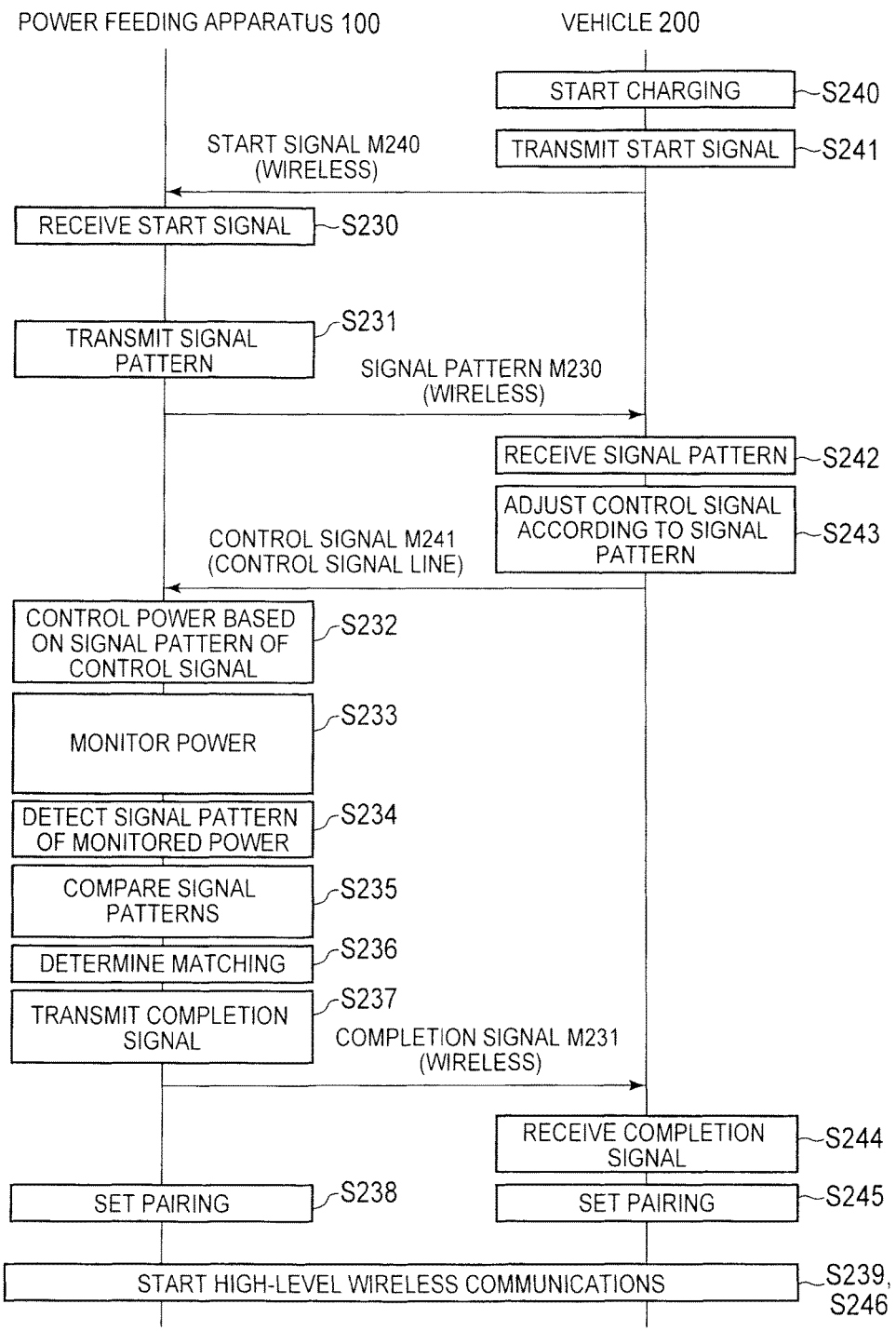

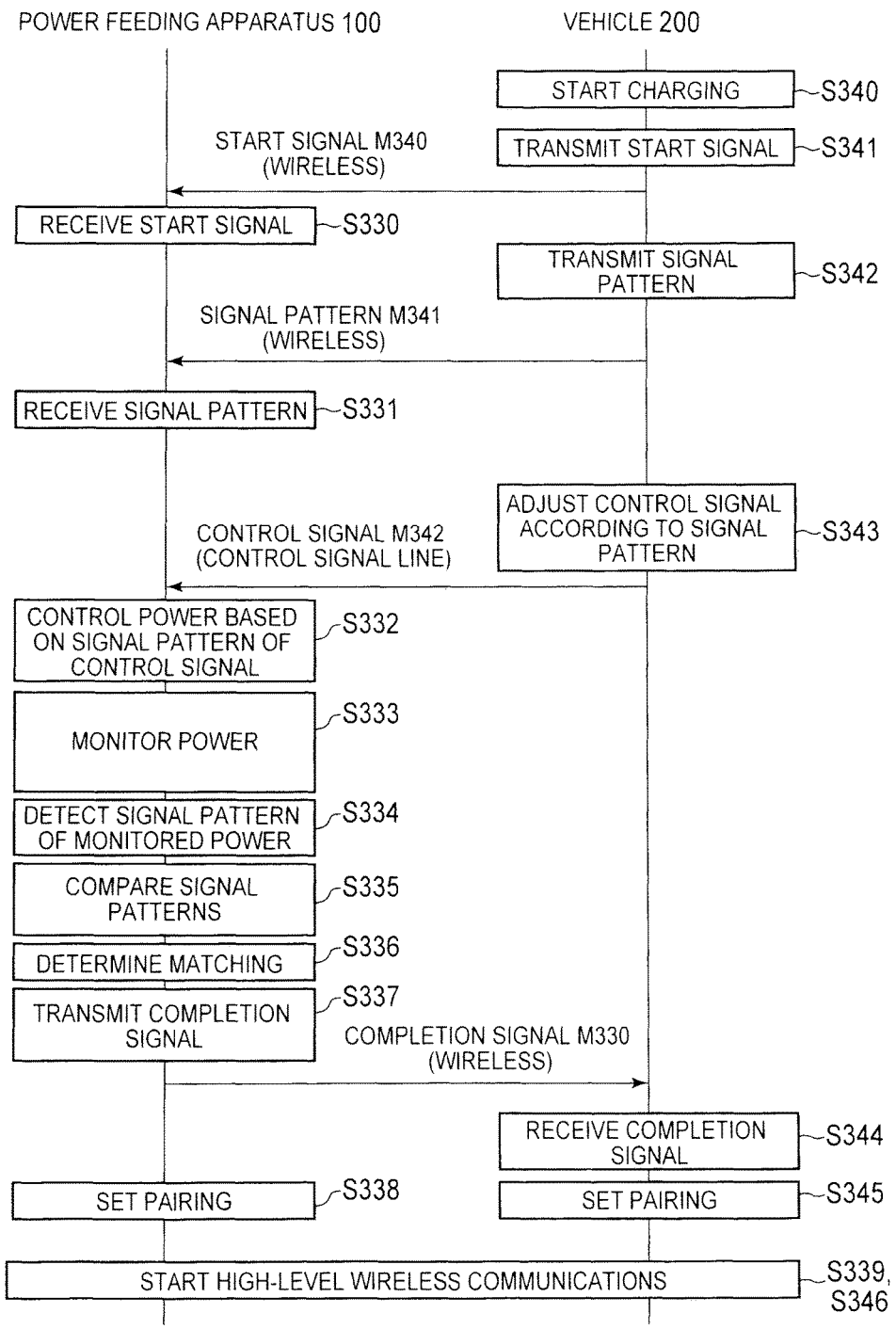

CHARGING SYSTEM AND PAIRING METHOD

BACKGROUND OF THE INVENTION

1. Field of the Invention

The invention relates to a charging system that supplies electric power from a power feeding apparatus to a storage battery installed on a vehicle, or the like, and also relates to a pairing method used by the charging system, for specifying correspondence between a charging apparatus that manages charging of the storage battery, and the power feeding apparatus.

2. Description of Related Art

As well known in the art, a charging system for charging a storage battery installed on a vehicle, such as a plug-in hybrid vehicle or an electric vehicle, often includes a charging apparatus and a power feeding apparatus. The charging apparatus is configured to manage charging of the storage battery installed on the vehicle, inside the vehicle. The power feeding apparatus is configured to supply electric power with which the storage battery is to be charged, from the outside of the vehicle to the charging apparatus, via a power feed line. Namely, in the charging system as described above, the power feeding apparatus as a separate apparatus from the charging apparatus supplies electric power to the charging apparatus when it is connected to the charging apparatus via the power feed line. One example of this type of charging system is described in Japanese Patent Application Publication No. 2010-142096 (JP 2010-142096 A).

The charging system (power feeding system) described in JP 2010-142096 A includes an IC tag and an IC tag reader. The IC tag is incorporated in or mounted on a power receiving plug at a distal end of a cable used for charging the in-vehicle battery (storage battery). The IC tag reader is installed within a charging station (power feeding apparatus) for automobiles, or a power-feeding outlet of a charger, or in the vicinity thereof In operation, the IC tag reader reads data on the IC tag mounted on the power receiving plug, and cross-checks the data thus read and data registered in advance, so that the charging system can start power feeding from the power-feeding outlet if these data coincide with each other.

In recent years, the charging system as described above is desired to have an enhanced or advanced function of charging the storage battery. To this end, a lot of information needs to be supplied and received between the power feeding apparatus and the charging apparatus. While the power feed line that connects the power feeding apparatus with the charging apparatus is normally configured to meet a standard or restrictions for assuring safety, convenience, etc., the power feed line is not configured to be used for communications. Therefore, it is practically difficult to supply and receive information via the power feed line.

SUMMARY OF THE INVENTION

The invention provides a charging system that permits communication of information between a power feeding apparatus and a charging apparatus, as well as power feeding therebetween, and also provides a pairing method used by the charging system, for easily achieving pairing for specifying the correspondence relationship between the power feeding apparatus and the charging apparatus.

A charging system according to a first aspect of the invention includes a charging apparatus including a power receiving unit that receives electric power with which a storage battery is charged, and a power feeding apparatus including a power feeding unit connected to the power receiving unit of the charging apparatus and configured to supply electric power to the power feeding unit. The power feeding unit and the power receiving unit are connected to each other via a power line that transmits electric power, and a control signal line that transmits a control signal for controlling transmission of the electric power. The power feeding apparatus and the charging apparatus are configured to transmit the electric power based on control according to the control signal. The power feeding apparatus and the charging apparatus include respective communication devices that permit mutual communication between the power feeding apparatus and the charging apparatus, separately from communication established by connection between the power feeding unit and the power receiving unit. The power feeding apparatus and the charging apparatus are configured to share a first temporary signal pattern to be given to the control signal, based on communication via the communication devices. At least one of the power feeding apparatus and the charging apparatus is configured to determine that the power feeding apparatus and the charging apparatus are connected to each other via the power feeding unit and the power receiving unit while communicating with each other via the respective communication devices, when a second temporary signal pattern detected from the control signal transmitted via the control signal line coincides with the first temporary signal pattern shared based on the communication via the communication devices.

With the above arrangement, it can be determined that the power feeding apparatus and the charging apparatus with the power receiving unit and the power feeding unit connected to each other are also connected via communications using the communication devices, which are secured separately from communications using the connection between the power receiving unit and the power feeding unit. For example, the power feeding apparatus and the charging apparatus with the power receiving unit and the power feeding unit connected to each other can communicate with each other via general wireless communications or network communications. Thus, the power feeding apparatus and the charging apparatus can communicate with each other, while maintaining connection between the power receiving unit and the power feeding unit, which includes the power line, or the like, and cannot be easily changed or modified due to a standard, specifications, or the like. Since the power feeding apparatus and the charging apparatus can supply and receive a lot of information therebetween via the above-mentioned communications, higher-performance charge control can be performed.

Also, since the power feeding apparatus and the charging apparatus are arranged to handle and detect the control signal used for power feeding, it is easy for these apparatuses to detect the signal pattern given to the control signal. Namely, the shared first temporary signal pattern can be easily compared with the detected second temporary signal pattern.

In the charging system according to the first aspect of the invention, the power feeding apparatus may be adapted to supply AC power, and the control signal may control feeding of the AC power. According to a standard (e.g., SAE J1772) for charging with an AC power supply, when the power receiving unit and the power feeding unit are connected to each other, the power lines and the control signal lines (CPLT lines) of the respective units are connected, but a channel for communication of information is not secured. Namely, with the above arrangement, even when no channel for information communication is secured solely from connection between the power receiving unit and the power feeding unit, a channel for information communication can be secured, separately from the channel provided by connection between the power receiving unit and the power feeding unit.

In the charging system according to the first aspect of the invention, one of the power feeding apparatus and the charging apparatus may be configured to adjust the control signal by changing a voltage or duty ratio of the control signal, and the other of the power feeding apparatus and the charging apparatus may be configured to detect the second temporary signal pattern of the control signal, from change in the voltage or duty ratio of the control signal.

With the above arrangement, while the use of the control signal is fixed or determined in advance, it is possible to transmit the second temporary signal pattern via the control signal, by changing the voltage or duty ratio of the control signal.

In the charging system according to the first aspect of the invention, the first temporary signal pattern may be created by the power feeding apparatus. Also, when the second temporary signal pattern detected from the control signal coincides with the first temporary signal pattern, the charging apparatus may be configured to inform the power feeding apparatus of matching of the second temporary signal pattern with the first temporary signal pattern, through communication via the communication devices.

With the above arrangement, the control signal can be changed by the power feeding apparatus. Also, the result of determination by the charging apparatus that the two temporary signal patterns coincide with each other can be utilized by the charging apparatus and the power feeding apparatus.

In the charging system according to the first aspect of the invention, the first temporary signal pattern may be created by the charging apparatus. When the second temporary signal pattern detected from the control signal coincides with the first temporary signal pattern, the power feeding apparatus may be configured to inform the charging apparatus of matching of the second temporary signal pattern with the first temporary signal pattern, through communication via the communication devices.

With the above arrangement, the control signal can be changed by the charging apparatus. Also, the result of determination by the power feeding apparatus that the two temporary signal patterns coincide with each other can be utilized by the charging apparatus and the power feeding apparatus.

In the charging system according to the first aspect of the invention, the charging apparatus may be configured to change energy of electric power delivered from the power feeding apparatus according to the first temporary signal pattern by changing the control signal based on the first temporary signal pattern. Also, the power feeding apparatus may be configured to detect a third temporary signal pattern in the electric power as a change of the control signal based on the first temporary signal pattern, and compare the third temporary signal pattern with the first temporary signal pattern.

With the above arrangement, the charging apparatus changes the control signal based on the shared first temporary signal pattern, so that the shared first temporary signal pattern is included in the electric power delivered from the power feeding apparatus, and the power feeding apparatus can detect the first temporary signal pattern given to the control signal via the electric power. This makes it possible to compare the third temporary signal pattern detected (as first temporary signal pattern) via the electric power controlled by use of the control signal, with the shared first temporary signal pattern.

In the charging system according to the first aspect of the invention, the charging apparatus may store the first temporary signal pattern, and may be configured to share the stored first temporary signal pattern with the power feeding apparatus, by communicating with the power feeding apparatus via the communication devices.

With the above arrangement, the charging apparatus stores the shared first temporary signal pattern, so that the power feeding apparatus can specify the charging apparatus by use of the shared signal pattern.

In the charging system according to the first aspect of the invention, the power feeding apparatus may store the first temporary signal pattern, and may be configured to share the stored first temporary signal pattern with the power feeding apparatus, by communicating with the charging apparatus via the communication devices.

With the above arrangement, the power feeding apparatus stores the shared first temporary signal pattern, so that the charging apparatus can specify the power feeding apparatus by use of the shared signal pattern.

A second aspect of the invention is concerned with a pairing method of associating a charging apparatus with a power feeding apparatus, the charging apparatus including a power receiving unit that receives electric power with which a storage battery is charged, the power feeding apparatus including a power feeding unit connected to the power receiving unit of the charging apparatus and being configured to supply electric power to the power feeding unit. The pairing method includes: connecting the power feeding unit and the power receiving unit to each other via a power line that transmits electric power, and a control signal line that transmits a control signal for controlling transmission of the electric power; establishing mutual communication between the power feeding apparatus and the charging apparatus, via communication devices respectively provided in the power feeding apparatus and the charging apparatus, and sharing a first temporary signal pattern of the control signal between the power feeding apparatus and the charging apparatus through the mutual communication; and causing at least one of the power feeding apparatus and the charging apparatus to determine that the power feeding apparatus and the charging apparatus are connected to each other via the power feeding unit and the power receiving unit while communicating with each other via the respective communication devices, when a second temporary signal pattern detected from the control signal transmitted via the control signal line coincides with the first temporary signal pattern.

According to the above-described method, the correspondence relationship, through communication, between the power feeding apparatus and the charging apparatus that are connected via the power feeding unit and the power receiving unit is specified or confirmed, namely, pairing is accomplished, based on the fact that communications other than communications using connection between the power feeding unit and the power receiving unit are established between the power feeding apparatus and the charging apparatus. Thus, it is possible to secure communications, other than communications using connection between the power feeding unit and the power receiving unit, between the power feeding apparatus and the charging apparatus, using general wireless communications or network communications, which provide a communication environment under which a large indefinite number of communication devices can communicate one another.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a sequence diagram showing the behaviors of the power feeding apparatus and the charging apparatus during the pairing operation of the charging system of the second embodiment;

FIG. 11 is a flowchart illustrating a pairing operation of a power feeding apparatus in a charging system according to a third embodiment of the invention;

FIG. 12 is a flowchart illustrating a pairing operation of a charging apparatus (vehicle) in the charging system of the third embodiment;

FIG. 13 is a sequence diagram showing the behaviors of the power feeding apparatus and the charging apparatus during the pairing operation of the charging system of the third embodiment;

FIG. 16 is a sequence diagram showing the behaviors of the power feeding apparatus and the charging apparatus during the pairing operation of the charging system of the fourth embodiment.

DETAILED DESCRIPTION OF EMBODIMENTS

A charging system according to a first embodiment of the invention will be described with reference to FIG. 1 through FIG. 7. In this embodiment, a vehicle 200 is an electric vehicle or a hybrid vehicle (in particular, plug-in hybrid vehicle) on which a storage battery serving as a power supply for an electric motor is installed.

Figure 1:
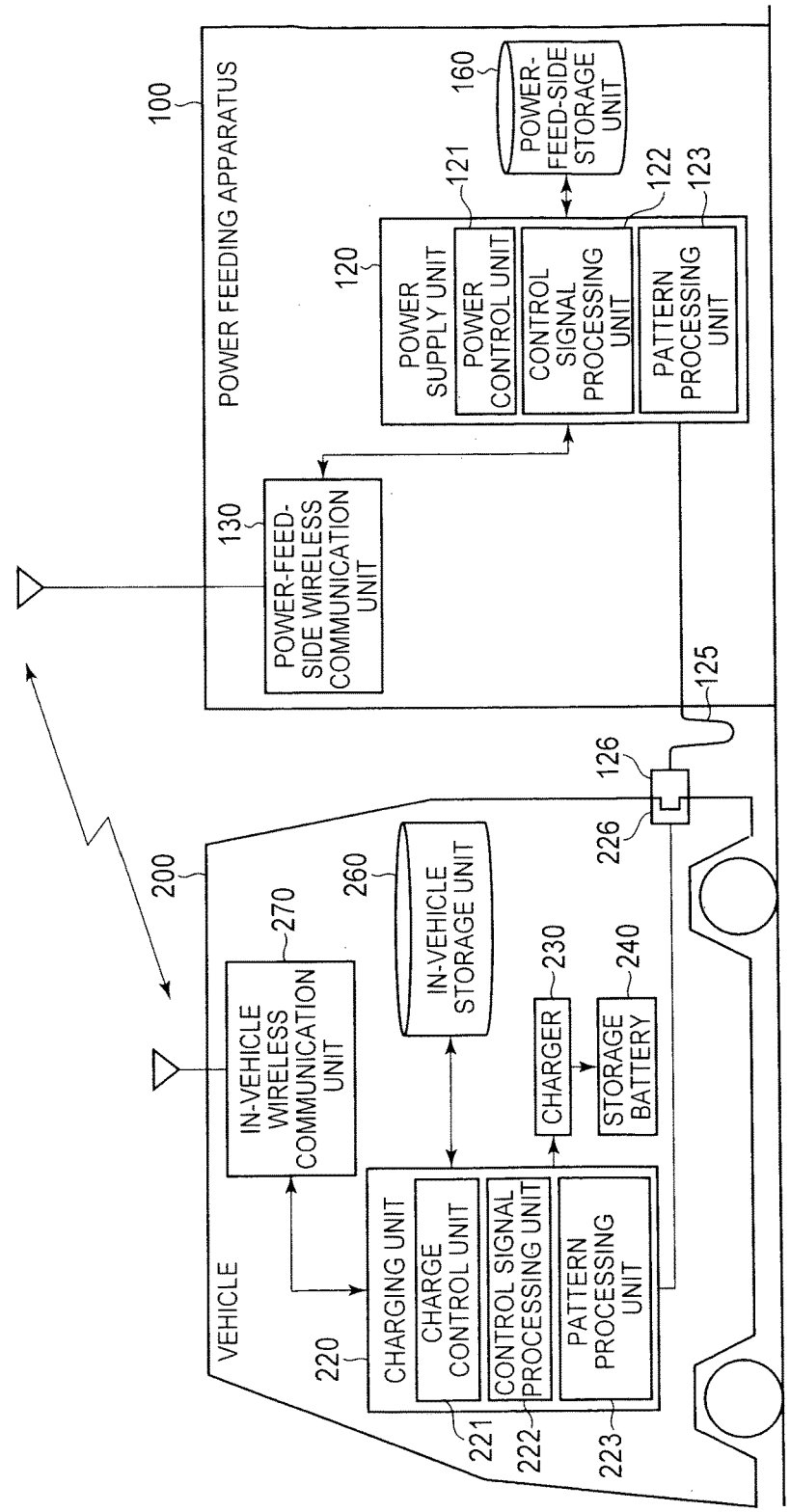
FIG. 1 is a block diagram schematically showing the configuration of a charging system as a first embodiment of the invention.

Initially, the charging system will be briefly described. As shown in FIG. 1, the charging system of this embodiment roughly consists of the vehicle 200 on which the storage battery 240 is installed, and a power feeding apparatus 100 that supplies AC power for charging the storage battery 240 of the vehicle 200 from outside the vehicle 200. The power feeding apparatus 100 may be a so-called plug-in station, for example.

The power feeding apparatus 100 receives electric power from a power line (not shown), or the like. The power feeding apparatus 100 includes a power supply unit 120 that supplies electric power to the vehicle 200, and a power-feed-side storage unit 160 connected to the power supply unit 120 such that information can be communicated therebetween. The power feeding apparatus 100 also includes a power-feed-side wireless communication unit 130 as a communication device that permits wireless communications between the power feeding apparatus 100 and the vehicle 200. The power feeding apparatus 100 further includes a cable 125 electrically connected to the power supply unit 120, and a power-feed-side connector 126 as a power feeding unit provided at a distal end of the cable 125.

The vehicle 200 includes a charging unit 220 that receives AC power from the power feeding apparatus 100, a charger 230 to which the power is transmitted from the charging unit 220, the storage battery 240 adapted to be charged with output power of the charger 230, and an in-vehicle storage unit 260 that is connected to the charging unit 220 such that information can be communicated therebetween. The vehicle 200 also includes an in-vehicle wireless communication unit 270 as a communication device that permits wireless communications between the vehicle 200 and the power feeding apparatus 100. The vehicle 200 further includes an inlet 226 that is electrically connected to the charging unit 220, and serves as a power receiving unit to which the power-feed-side connector 126 of the power feeding apparatus 100 is connected. The above-indicated charging unit 220, in-vehicle storage unit 260 and in-vehicle wireless communication unit 270 constitute a charging apparatus.

The power-feed-side connector 126 of the power feeding apparatus 100 and the inlet 226 of the vehicle 200 are connected to each other, so that electric power and a control signal can be transmitted therebetween. Namely, when the power-feed-side connector 126 and the inlet 226 are connected to each other, the power feeding apparatus 100 and the vehicle 200 are connected so that electric power for use in charging is supplied from the power feeding apparatus 100 to the vehicle 200, based on the control signal.

Figure 2:
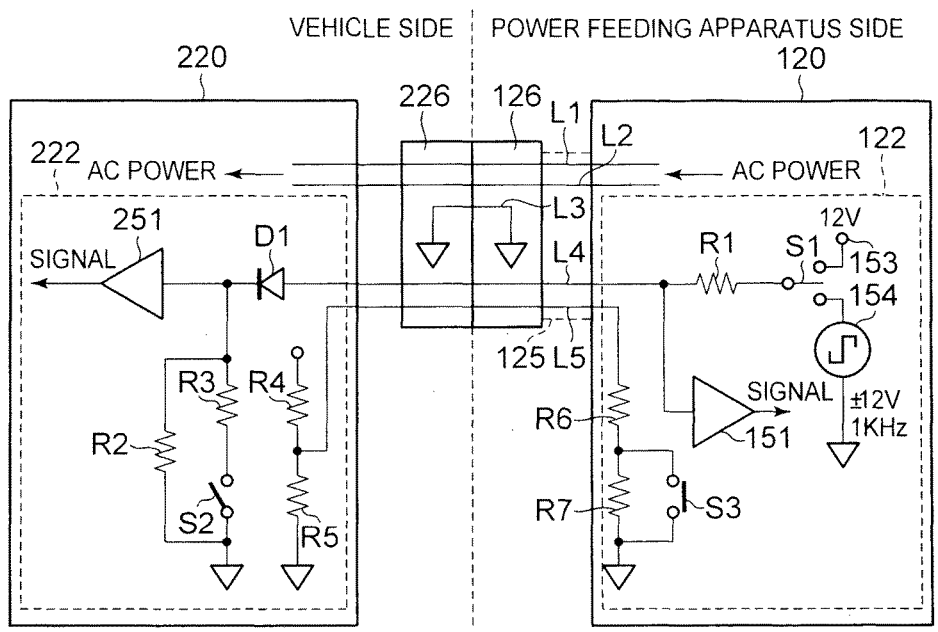
FIG. 2 is a circuit diagram showing the connecting arrangement of a power feed line of the charging system of FIG. 1.

As shown in FIG. 2, each of the power-feed-side connector 126 and the inlet 226 includes power lines L1, L2 through which electric power is supplied, a ground line L3, a control signal line L2 through which the control signal is transmitted, and a connection detection line L5. When the power-feed-side connector 126 and the inlet 226 are connected to each other, the power lines L1, L2, ground line L3, control signal line L4 and connection detection line L5 of one of the connector 126 and the inlet 226 are respectively connected with those of the other. Namely, when the power-feed-side connector 126 and the inlet 226 are connected to each other, the power supply unit 120 of the power feeding apparatus 100 and the charging unit 220 of the vehicle 200 are electrically connected via the power lines L1, L2, ground line L3, control signal line L4, and the connection detection line L5. In this embodiment, a channel that connects the power lines L1, L2, etc. between the power feeding apparatus 100 and the vehicle 200 will be referred to as a power feed line or feed line. For example, the feed line includes the cable 125, power-feed-side connector 126 and the inlet 226.

In the meantime, in this embodiment, the power feeding apparatus 100 and the vehicle 200 are connected based on a standard concerning feeding of AC power, in this embodiment, a standard defined as SAE (Society of Automotive Engineers) J1772. Namely, the power-feed-side connector 126 and the inlet 226 are designed to satisfy the SAE J1772 standard. Accordingly, it is practically difficult in terms of the safety and the convenience to change or modify the configurations of the power-feed-side connector 126 and the inlet 226 to be different from those of the above-indicated standard. Namely, even if information is to be communicated between the power feeding apparatus 100 and the vehicle 200, no communication line is provided in the power feed line. It is also not easy to provide the power feed line with a communication line.

Also, the control signal of the control signal line L4 corresponds to a control pilot signal (CPLT signal) according to the SAE J1772 standard. Namely, the control signal is a signal for transmitting only the information specified as the CPLT signal of SAE J1772.

In this embodiment, the power feeding apparatus 100 and the vehicle 200 communicate with each other via the respective wireless communication units 130, 270. Then, through wireless communications, various kinds of information, which cannot be transmitted via the power feed line, can be communicated between the power feeding apparatus 100 and the vehicle 200. Namely, so-called high-level wireless communication is conducted between the power feeding apparatus 100 and the vehicle 200. It is thus possible to achieve a further improvement in the charging function, by permitting various kinds of information to be communicated between the power feeding apparatus 100 and the vehicle 200.

The relation of connection between the power feeding apparatus 100 and the vehicle 200 is mechanically specified by connection of the power feed line. On the other hand, for connection via wireless communication, it is required to confirm that the destination of connection via wireless communication coincides with the destination of connection via the power feed line, and specify the relation of connection between the power feeding apparatus 100 and the vehicle 200, namely, it is required to perform so-called "pairing". Thus, in this embodiment, a pairing operation is performed so as to permit wireless communications between the power feeding apparatus 100 and the vehicle 200 connected with the power feed line. Then, in this embodiment, a temporary signal pattern prepared for pairing is transmitted via wireless communication to be shared between the power feeding apparatus 100 and the vehicle 200, and is also transmitted via the power feed line, so that it can be determined whether the destination of connection via the power line coincides with the destination of connection via wireless communication.

Next, the power feeding apparatus 100 will be described in detail. The power-feed-side storage unit 160 is a non-volatile storage device, and stores various parameters used in the pairing operation and other operations. The power-feed-side storage unit 160 may store programs, etc., according to which the power supply unit 120 performs computations. The power-feed-side storage unit 160 also stores various items of information, such as a shared temporary signal pattern, which are transmitted from the vehicle 200 via wireless communication.

The power supply unit 120 includes a power control unit 121 that controls the amount of electric power supplied to the vehicle 200, and a control signal processing unit 122 that transmits and receives a control signal for controlling power feeding to and from the vehicle 200, and transmits the content of the transmitted or received control signal to the power control unit 121. Also, the power supply unit 120 includes a pattern processing unit 123 that performs various operations in connection with a signal pattern of the control signal. The power supply unit 120 includes a small-sized computer having a computing unit, a volatile or non-volatile memory, and so forth, and causes the computing unit, or the like, to perform computations using various programs or parameters stored in the memory or the power-feed-side storage unit 160, so as to provide necessary functions. Namely, the power supply unit 120 performs computations according to respective programs corresponding to the power control unit 121, control signal processing unit 122 and the pattern processing unit 123, so as to implement the functions of the power control unit 121, control signal processing unit 122, and the pattern processing unit 123.

The power control unit 121 determines output/cutoff of electric power delivered to the power lines L1, L2, and the amount of the output power. The power control unit 121 determines output/cutoff of electric power, and the amount of the output power, based on the control signal, etc. received from the control signal processing unit 122. The power control unit 121 adjusts the voltage or current based on the control signal, for example, so as to control the amount of electric power delivered to the power lines L1, L2. Namely, the power control unit 121 changes the amount of electric power, etc., in response to changes in the state of the control signal.

The control signal processing unit 122 transmits and receives the control signal to and from the vehicle 200 via the control signal line L4. The control signal processing unit 122 receives a signal specifying the feasibility of power feeding or the amount of electric power to be supplied, for example, as the control signal, and outputs the content based on the received control signal to the power control unit 121. Also, the control signal processing unit 122 outputs a signal required for signal transmission via the control signal line L4, so that the vehicle 200 can receive the signal. Namely, the control signal processing unit 122 can detect the control signal received from the vehicle 200, and can change the control signal to be transmitted to the vehicle 200.

The control signal line L4 serves to reliably transmit, as the control signal, conditions essential to power feeding between the power feeding apparatus 100 and the vehicle 200, and the types of information included in the control signal are determined in advance. Generally, the types of the information included in the control signal cannot be changed by the user. Namely, the type of control signal received by the control signal processing unit 122 and the type of control signal transmitted from the same unit 122 are limited to predetermined types.

The pattern processing unit 123 is connected to the control signal processing unit 122 such that information can be communicated therebetween. The pattern processing unit 123 is also connected to the power-feed-side storage unit 160 such that information can be communicated therebetween. The pattern processing unit 123 is able to refer to and obtain a shared temporary signal pattern stored in the power-feed-side storage unit 160.

The pattern processing unit 123 is also able to change the control signal transmitted from the power feeding apparatus 100 to the vehicle 200. Namely, the pattern processing unit 123 sends a command indicative of the shared temporary signal pattern to the control signal processing unit 122, so as to change the control signal generated from the control signal processing unit 122 in a manner based on the shared temporary signal pattern. The shared temporary signal pattern indicated by the pattern processing unit 123 makes it possible to change the control signal within the ranges of voltage and duty ratio which are predetermined as the specifications of the control signal. The pattern processing unit 123 is able to obtain the shared temporary signal pattern indicated to the control signal processing unit 122, from the power-feed-side storage unit 160.

The pattern processing unit 123 may create a temporary signal pattern to be shared for use in the pairing operation, as a signal pattern that brings about changes in the control signal. The pattern processing unit 123 may also detect a signal pattern of the control signal transmitted from the vehicle 200 to the power feeding apparatus 100. Namely, the pattern processing unit 123 may receive the control signal from the control signal processing unit 122, and detect changes in the control signal as a temporary signal pattern. The pattern processing unit 123 may also compare the temporary signal pattern detected from the control signal, with the shared temporary signal pattern stored in the power-feed-side storage unit 160, and determine whether these temporary signal patterns coincide with each other.

Next, the vehicle 200 will be described in detail. The storage battery 240 is a secondary battery, such as a lithium-ion battery or a nickel-metal-hydride battery, which is suitable as a power supply of the vehicle. The storage battery 240 is adapted to be charged with DC power and discharge DC power.

When the storage battery 240 is charged, the power-feed-side connector 126 of the power feeding apparatus 100 is connected to the inlet 226, so that the charging unit 220 receives AC power, and is also able to transmit and receive the control signal.

The charger 230 receives the AC power via the charging unit 220, and the amount of electric power with which the storage battery 240 is to be charged is controlled by the charging unit 220. Then, the charger 230 converts the received AC power to DC power suitable for charging of the storage battery 240, under control of the charging unit 220, and delivers the DC power to the storage battery 240. Then, the storage battery 240 is charged with the DC power delivered from the charger 230.

The in-vehicle storage unit 260 is a non-volatile storage unit, and stores various parameters, such as a shared temporary signal pattern, used in the pairing operation, and other operations. The in-vehicle storage unit 260 may store programs, etc., according to which the charging unit 220 perform computations. Also, the in-vehicle storage unit 260 may store various kinds of information transmitted from the power feeding apparatus 100 via wireless communication.

The charging unit 220 includes a charge control unit 221 that controls the amount of electric power with which the storage battery 240 is charged, and a control signal processing unit 222 that transmits and receives the control signal for controlling power feeding to and from the power feeding apparatus 100, and transmits the received control signal to the charge control unit 221. The charging unit 220 also includes a pattern processing unit 223 that performs various operations on a signal pattern of the control signal. The charging unit 220 includes a small-sized computer having a computing unit, a volatile or non-volatile memory, and so forth, and causes the computing unit, or the like, to perform computations using various programs or parameters stored in the memory or the in-vehicle storage unit 260, so as to provide necessary functions. Namely, the charging unit 220 performs computations according to respective programs corresponding to the charge control unit 221, control signal processing unit 222, and the pattern processing unit 223, so as to implement the functions of the charge control unit 221, control signal processing unit 222, and the pattern processing unit 223.

The charge control unit 221 determines output/cutoff of electric power received from the power lines L1, L2, and the amount of the received electric power. Also, the charge control unit 221 controls the charger 230 so that charging is performed according to the amount of the received electric power. Furthermore, the charge control unit 221 outputs a control signal indicative of the amount of electric power appropriate for charging of the storage battery 240, from the control signal processing unit 222 to the power feeding apparatus 100. Namely, the charge control unit 221 is able to change the state of the control signal.

The control signal processing unit 222 transmits and receives the control signal to and from the power feeding apparatus 100 via the control signal line L4. The control signal processing unit 222 receives a signal specifying the feasibility of power feeding or the amount of electric power supplied, and outputs the content based on the received control signal to the charge control unit 221. Also, the control signal processing unit 222 is able to create a signal required for signal transmission via the control signal line L4, and transmit the signal to the power feeding apparatus 100. Namely, the control signal processing unit 222 is able to detect the control signal received from the power feeding apparatus 100, and is also able to change the control signal to be transmitted to the power feeding apparatus 100. As described above, the control signal line L4 serves to transmit, as the control signal, conditions essential to power feeding, and the types of information included in the control signal cannot be changed by the user. Namely, the type of control signal received by the control signal processing unit 222 and the type of control signal generated from this unit 222 are limited to predetermined types.

The pattern processing unit 223 is connected to the control signal processing unit 222 such that information can be communicated therebetween. The pattern processing unit 223 is also connected to the in-vehicle storage unit 260 such that information can be communicated therebetween, and is able to refer to and obtain a shared temporary signal pattern stored in the in-vehicle storage unit 260. Furthermore, the pattern processing unit 223 detects a temporary signal pattern from the control signal.

The pattern processing unit 223 can detect the signal pattern of the control signal transmitted from the power feeding apparatus 100 to the vehicle 200. Namely, the pattern processing unit 223 receives the control signal from the control signal processing unit 222, and detects changes in the control signal as a temporary signal pattern. Also, the pattern processing unit 223 can compare the temporary signal pattern detected from the control signal, with the shared temporary signal pattern stored in the in-vehicle storage unit 260, and determine whether these temporary signal patterns coincide with each other.

The pattern processing unit 223 may be able to change the control signal transmitted from the vehicle 200 to the power feeding apparatus 100. Namely, the pattern processing unit 223 may send a command indicative of the shared temporary signal pattern to the control signal processing unit 222, so as to change the control signal generated from the control signal processing unit 222 in a manner based on the temporary signal pattern. The shared temporary signal pattern indicated by the pattern processing unit 223 is preferably a pattern that makes it possible to change the control signal within the range of voltage which is predetermined as the specifications of the control signal. The pattern processing unit 223 may obtain the shared temporary signal pattern indicated to the control signal processing unit 222, from the in-vehicle storage unit 260.

Next, communication of the control signal between the power feeding apparatus 100 and the vehicle 200 will be described in detail. As shown in FIG. 2, when the power supply unit 120 of the power feeding apparatus 100 and the charging unit 220 of the vehicle 200 are connected via the power feed line (cable 125, power-feed-side connector 126 and inlet 226), the power lines L1, L2, ground line L3, control signal line L4 and connection detection line L5 of the power feeding apparatus 100 are connected with the corresponding lines of the vehicle 200.

The control signal line L4 has a signal detecting portion and a signal output portion connected in parallel, in each of the power supply unit 120 and the charging unit 220. Since electric power used for control is supplied from the power supply unit 120 to the control signal line L4, the charging unit 220 includes a diode D1 for preventing back-flow of electric power used for control, such that the diode D1 is connected in series between the signal detecting portion and signal output portion, and the power supply unit 120.

The signal detecting portion of the power supply unit 120 includes a signal detector 151 that detects the control signal flowing through the control signal line L4, and outputs the result of detection to the power control unit 121 and the pattern processing unit 123.

The signal output portion of the power supply unit 120 has a resistor R1 and a switch Si connected in series. The switch Si can be placed in an open state, or connected to a fixed voltage terminal 153 or a varying voltage terminal 154. The fixed voltage terminal 153 generates a voltage of +12V, and the varying voltage terminal 154 generates a voltage signal comprised of a 1-kHz rectangular wave of ±12V. Thus, by operating the switch S1, it is possible for the power supply unit 120 to deliver an open-circuit voltage, +12V-voltage, or 1-kHz rectangular wave of ±12V, to the control signal line L4.

Also, the power supply unit 120 can change the duty ratio of the rectangular wave of ±12V according to the voltage of the control signal line L4. Namely, while the type and rules of the control signal generated through operation of the switch S1 are specified by the SAE J1772 standard, the power supply unit 120 can switch the voltage of the control signal line L4 between the open-circuit voltage and the voltage of +12V by operating the switch S1, so as to change the voltage at desired times. The power supply unit 120 can also change the duty ratio of the rectangular wave of ±12V to a desired ratio, at desired times.

The signal detecting portion of the charging unit 220 includes a signal detector 251 that detects the control signal flowing through the control signal line L4, and outputs the result of detection to the charge control unit 221 and the pattern processing unit 223.

In the signal output portion of the charging unit 220, a resistor R2, and a series circuit of a resistor R3 and a switch S2, are connected in parallel with each other. Namely, the resistance value of the control signal line L4 becomes equal to that of the resistor R2 when the switch S2 is opened, and becomes equal to that of the resistor R2 and the resistor R3 connected in parallel when the switch S2 is closed. Namely, the resistance value of the control signal line L4 is lower when the switch S2 is closed, than that when the switch S2 is opened; therefore, the voltage of a portion of the control signal line L4 to which the signal detector 251 is connected is lower when the switch S2 is closed, than that when the switch S2 is opened. Namely, the charging unit 220 can change the voltage of the control signal line L4 at desired times, by opening and closing the switch S2.

The connection detection line L5 is a circuit for detecting a connecting condition of the power feed line. Since the condition of the connection detection line L5 is not utilized in the pairing operation of this embodiment, only the outline of the connection detection line L5 will be described. In the charging unit 220, a series circuit of a resistor R4 and a resistor R5 is provided between a power supply for control and the ground, and the connection detection line L5 connected to the power supply unit 120 is connected to a point between the resistor R4 and the resistor R5. In the power supply unit 120, a series circuit of a resistor R6 and a resistor R7 is provided between the connection detection line L5 and the ground, and a switch S3 that bypasses the resistor R7 for short-circuiting is connected in parallel to the resistor R7. With this arrangement, the voltage of the connection detection line L5 is changed by opening and closing the switch S3 of the power supply unit 120.

Next, the temporary signal pattern shared by the power feeding apparatus 100 and the vehicle 200 will be described. In this embodiment, the vehicle 200 stores the shared temporary signal pattern in advance, and is adapted to transmit the pattern to the power feeding apparatus 100 via wireless communication each time the pairing operation is needed. Namely, the shared temporary signal pattern originally stored in the vehicle 200 is shared between the vehicle 200 and the power feeding apparatus 100 via wireless communication.

Figure 3:
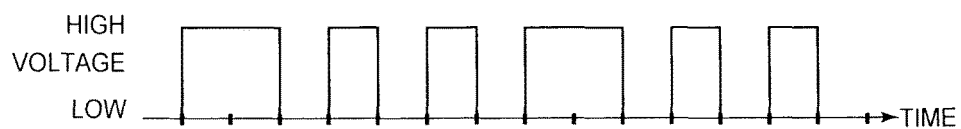
FIG. 3 is a view showing one example of signal pattern of a control signal used in the charging system of FIG. 1.

As shown in FIG. 3, the shared temporary signal pattern based on the voltage can be created by changing the level of the voltage at given times. In the temporary signal pattern as shown in FIG. 3, for example, the period of time for which the voltage is at a high level is controlled to be 2:1:1, with a period of time for which the voltage is at a low level interposed between adjacent ones of the high-voltage periods.

Figure 4:
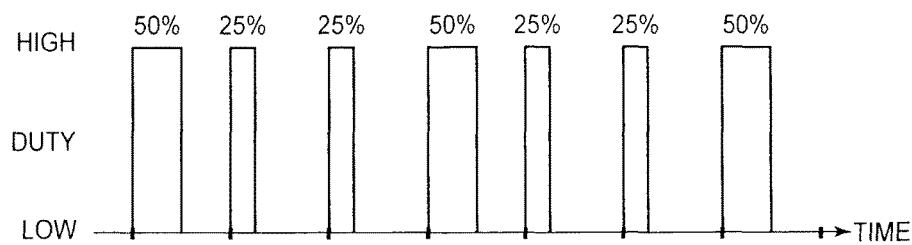
FIG. 4 is a view showing another example of signal pattern of a control signal used in the charging system of FIG. 1.

As shown in FIG. 4, the shared temporary signal pattern based on the duty ratio can be created by changing the duty ratio for each period of time at given times. In the signal pattern as shown in FIG. 4, for example, the duty ratio is changed periodically from 50% to 25%, and then to 25%.

The temporary signal pattern thus created based on the voltage or the duty ratio is made different from a signal pattern created in the control signal according to the SAE J1772 standard, so as to be distinguished from the control signal based on the SAE J1772 standard. Also, if the pairing operation is carried out before start of charging, so as not to interfere with the charging operation, the degree of freedom in creating the temporary signal pattern may be increased.

Next, the pairing operation performed in the charging system will be described. Initially, the procedure implemented by the power supply unit 120 and the procedure implemented by the charging unit 220 will be respectively described, and then, an example of the behaviors of the power supply unit 120 and the charging unit 220 will be sequentially described. In this embodiment, the pairing operation is performed before the storage battery 240 starts being charged. As a result, there is no possibility of affecting charging even if the control signal is changed. The pairing operation is started when the power feeding apparatus 100 or the vehicle 200 detects connection of the power feed line.

Figure 5:
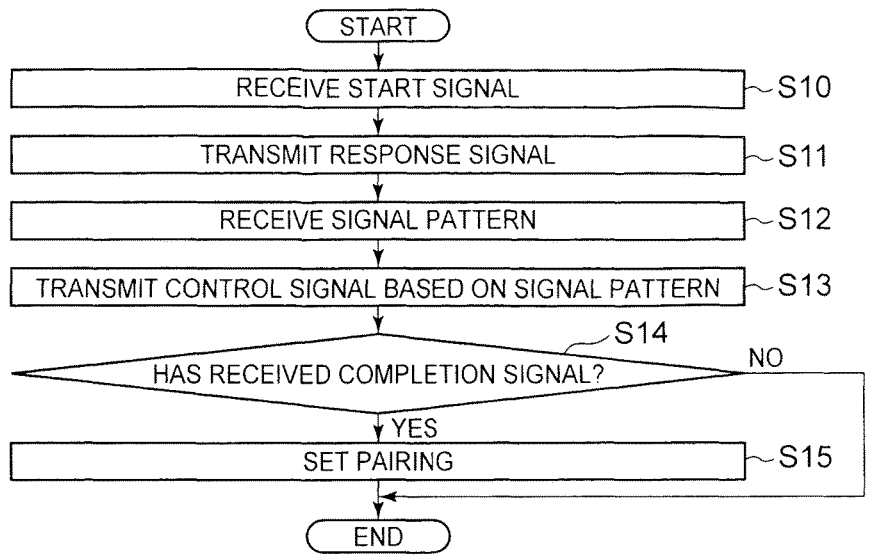
FIG. 5 is a flowchart illustrating a pairing operation of a power feeding apparatus in the charging system of FIG. 1.

As shown in FIG. 5, once the pairing operation is started, the power supply unit 120 receives a start signal indicative of start of the pairing operation from the vehicle 200 via wireless communication (step S10). When no start signal is received, the power supply unit 120 may wait in a condition where it can receive the start signal, until a given time elapses or a given condition is satisfied. Then, the power supply unit 120 transmits a response signal corresponding to the start signal, to the vehicle 200, via wireless communication (step S11).

Subsequently, the power supply unit 120 receives a temporary signal pattern to be shared, from the vehicle 200, via wireless communication (step S12), and changes the voltage or duty ratio of the control signal line L4 based on the shared temporary signal pattern thus received (step S13).

Then, the power supply unit 120 determines whether it has received a completion signal indicative of completion of the pairing operation, from the vehicle 200, via wireless communication (step S14). If the power supply unit 120 does not receive the completion signal, it may wait in a condition where it can receive the completion signal, until a given time elapses or a given condition is satisfied. Then, if it is determined that the completion signal is received (YES in step S14), the power supply unit 120 establishes completion of the pairing operation (step S15), and finishes the pairing operation. On the other hand, if it is determined that the completion signal is not received (NO in step S14), the power supply unit 120 terminates the pairing operation. Namely, the pairing operation is not accomplished.

Figure 6:
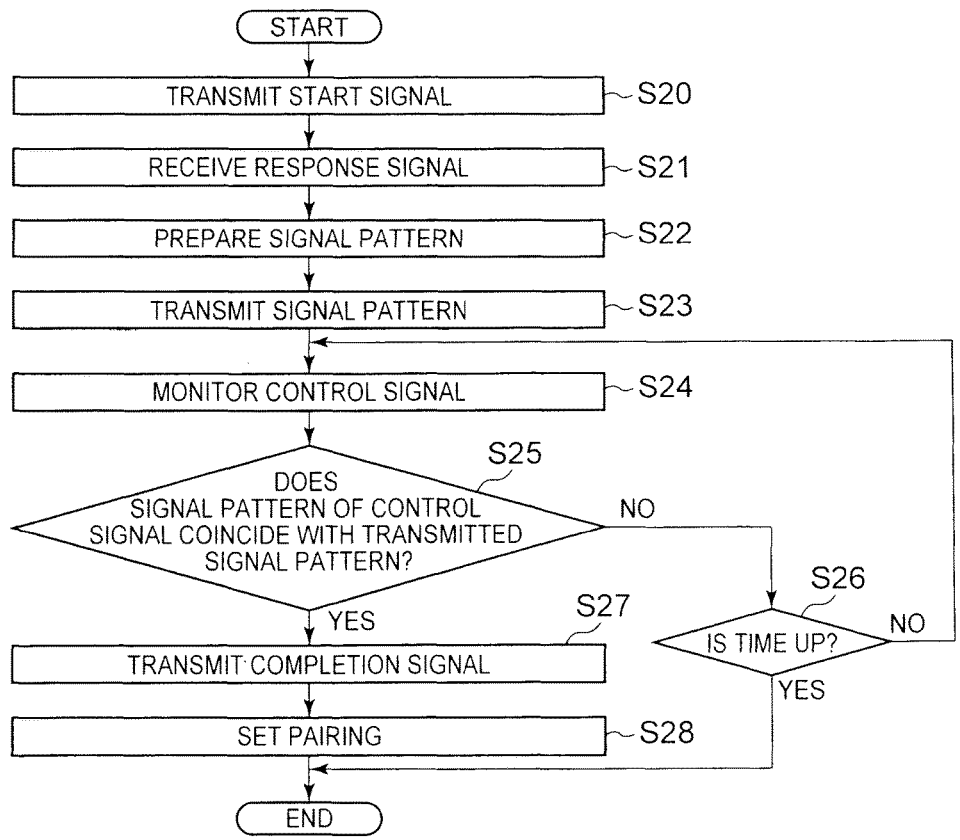
FIG. 6 is a flowchart illustrating a pairing operation of a charging apparatus (vehicle) in the charging system of FIG. 1.

As shown in FIG. 6, once the pairing operation is started, the charging unit 220 transmits the start signal indicative of start of the pairing operation, to the power feeding apparatus 100, via wireless communication (step S20). Then, the charging unit 220 receives the response signal corresponding to the start signal, from the power feeding apparatus 100, via wireless communication (step S21). Subsequently, the charging unit 220 prepares a temporary signal pattern to be shared and used in the pairing operation (step S22), and transmits the thus prepared temporary signal pattern to be shared, to the power feeding apparatus 100 (step S23).

Subsequently, the charging unit 220 monitors the control signal, and detects changes in the voltage or duty ratio arising in the control signal, as a temporary signal pattern (step S24). The charging unit 220 also determines whether the detected temporary signal pattern coincides with the shared temporary signal pattern transmitted to the power feeding apparatus 100 via wireless communication (step S25). If it is determined that the detected temporary signal pattern does not coincide with the shared temporary signal pattern transmitted to the power feeding apparatus 100 (NO in step S25), the charging unit 220 determines whether time is up (step S26). If it is determined that time is not up (NO in step S26), the charging unit 220 returns to step S24, and detects a temporary signal pattern. If, on the other hand, it is determined that time is up (YES in step S26), the charging unit 220 terminates the pairing operation. Namely, the pairing operation is not accomplished.

If it is determined that the detected temporary signal pattern coincides with the shared temporary signal pattern (YES in step S25), the charging unit 220 transmits the completion signal indicative of completion of the pairing operation to the power feeding apparatus 100 via wireless communication (step S27). The charging unit 220 also establishes completion of the pairing operation (step S28), and finishes the pairing operation.

Figure 7:
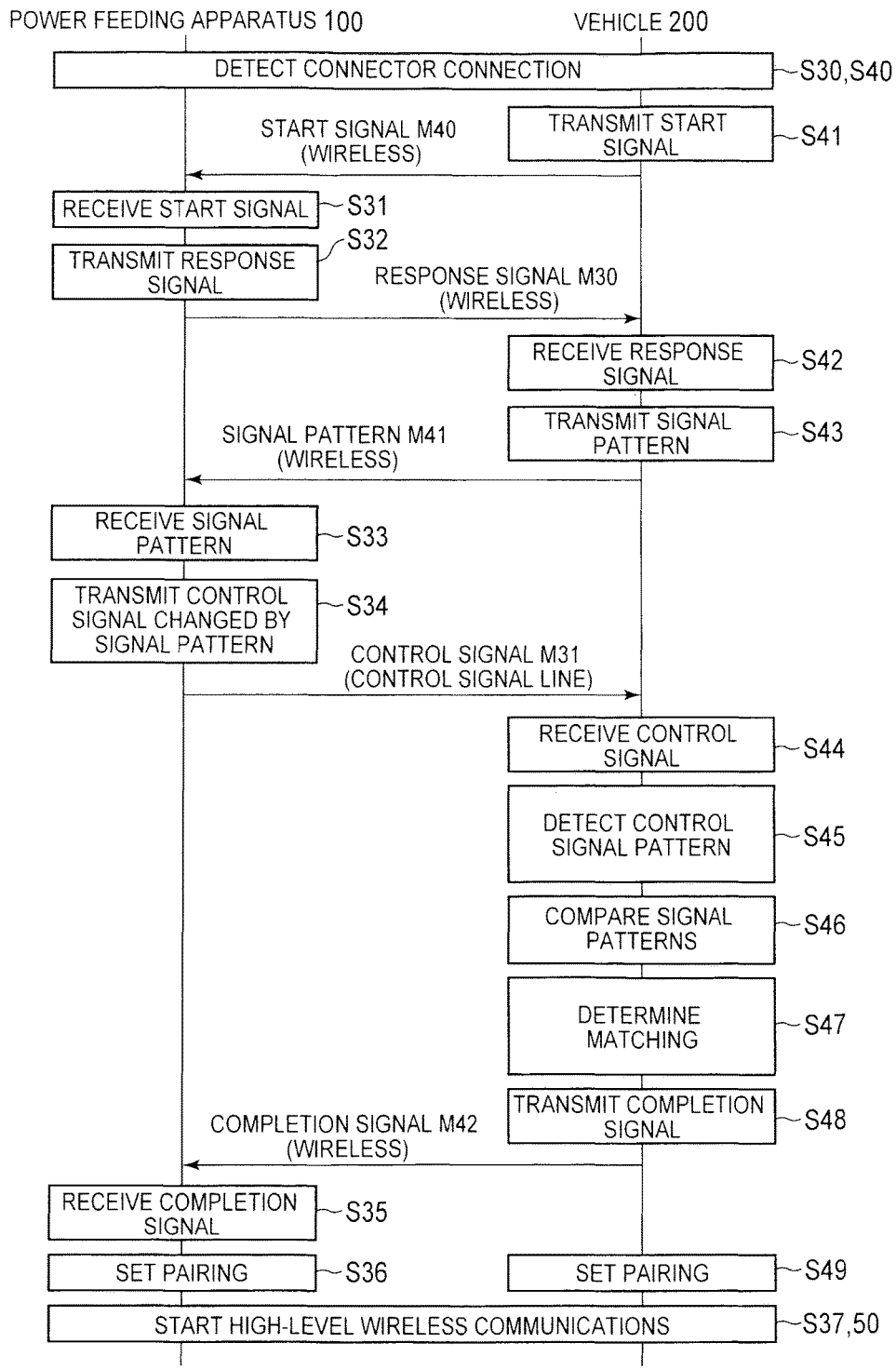
FIG. 7 is a sequence diagram showing the behaviors of the power feeding apparatus and the charging apparatus during the pairing operation of the charging system of FIG. 1.

The operation of this embodiment will be described based on the behaviors of the power feeding apparatus 100 (power supply unit 120) and the vehicle 200 (charging unit 220). As shown in FIG. 7, each of the power feeding apparatus 100 and the vehicle 200 starts its pairing operation when detecting that the power-feed-side connector 126 and the inlet 226 are connected to each other (step S30, S40).

Initially, the vehicle 200 transmits a start signal M40 to the power feeding apparatus 100 via wireless communication (step S41). The power feeding apparatus 100 receives the start signal M40 via wireless communication (step S31), and transmits a response signal M30 corresponding to the received start signal M40, to the vehicle 200, via wireless communication (step S32). The vehicle 200 receives the response signal M30 via wireless communication (step S42), and then transmits a temporary signal pattern M41 to be shared and used for pairing, to the power feeding apparatus 100, via wireless communication (step S43).

If the power feeding apparatus 100 receives the temporary signal pattern M41 via wireless communication (step S33), it adjusts the control signal so as to change the voltage or duty ratio of the control signal with a pattern corresponding to the shared temporary signal pattern (step S34). As a result, the control signal M31 having the shared temporary signal pattern is transmitted to the vehicle 200 via the control signal line L4. The vehicle 200 receives the control signal M31 having the shared temporary signal pattern (step S44), and detects the temporary signal pattern from the control signal M31 (step S45). Also, the vehicle 200 compares the detected temporary signal pattern with the shared temporary signal pattern transmitted via wireless communication, and determines whether these two temporary signal patterns coincide with each other (steps S46, S47). Then, if the vehicle 200 determines that these two temporary signal patterns coincide with each other, it transmits a completion signal M42 to the power feeding apparatus 100 (step S48), and establishes completion of pairing (step S49). Also, the power feeding apparatus 100 receives the completion signal M42 transmitted from the vehicle 200, via wireless communication (step S35), and establishes completion of pairing (step S36). If setting of pairing is completed in both of the power feeding apparatus 100 and the vehicle 200, the power feeding apparatus 100 and the vehicle 200 can start high-level wireless communications (steps S37, S50). Through the high-level wireless communications, the power feeding apparatus 100 and the vehicle 200 can send and receive various types of information including information useful for charging, such as the state of charge of the storage battery 240, to and from each other. Consequently, highly-functional charge control can be performed based on the information.

As described above, the charging system according to this embodiment provides the following effects. (1) When the power feeding apparatus 100 and the vehicle 200 are connected with the inlet 226 and the power-feed-side connector 126 connected to each other, the connection of the power feeding apparatus 100 and the vehicle 200 can also be specified by communications via the respective wireless communication units 130, 270, which are secured separately from communications via the inlet 226 and the power-feed-side connector 126 connected to each other. For example, the power feeding apparatus 100 and the vehicle 200 connected with the inlet 226 and the power-feed-side connector 126 connected to each other can communicate with each other via general wireless communications or network communications. Thus, the power feeding apparatus 100 and the vehicle 200 can communicate with each other, while maintaining connection between the inlet 226 and the power-feed-side connector 126 including the power lines L1, L2, etc., of which changes or modifications cannot be easily made due to the standard or specifications, for example. For example, the power feeding apparatus 100 and the vehicle 200 become able to communicate a lot of information via the above-mentioned communications, so that high-performance charge control can be performed.

Also, the power feeding apparatus 100 and the vehicle 200 operate or detect the control signal used for power feeding; therefore, it is also easy to detect a signal pattern given to the control signal. Namely, it is easy to compare the shared temporary signal pattern with the detected signal pattern.

(2) According to the standard (e.g., SAE J1772) of charging using the AC power supply, when the inlet 226 and the power-feed-side connector 126 are connected, the power lines L1, L2 and the control signal line (CPLT signal line) L4 are connected, but a channel for communication of information is not provided. Namely, even if no channel for information communication is provided solely by connection between the inlet 226 and the power-feed-side connector 126, a channel for information communication is secured, separately from the channel using connection between the inlet 226 and the power-feed-side connector 126.

(3) While the use of the control signal is fixed or determined in advance, it is possible to transmit the shared temporary signal pattern via the control signal, by changing the voltage or duty ratio of the control signal.

(4) The control signal can be changed by the power feeding apparatus 100. Also, the result of determination by the vehicle 200 that the above-indicated two temporary signal patterns coincide with each other can be utilized by the vehicle 200 and the power feeding apparatus 100.

(5) With the shared signal pattern stored in the vehicle 200, it is possible for the power feeding apparatus 100 to specify the vehicle 200 based on the shared signal pattern.

A charging system according to a second embodiment of the invention will be described with reference to FIG. 8 to FIG. 10. This embodiment is different from the first embodiment in that the vehicle 200 changes the control signal based on the temporary signal pattern, and the power feeding apparatus 100 detects the control signal thus changed, to perform the pairing operation. However, the configurations of the power feeding apparatus 100 and the vehicle 200 are substantially the same as those of the first embodiment, and therefore, will not be described for the sake of convenience.

In this embodiment, a temporary signal pattern is stored in advance in the power-feed-side storage unit 160. Also, the pattern processing unit 123 of the power feeding apparatus 100 can detect the temporary signal pattern from changes in the control signal, and can compare the detected temporary signal pattern with the shared temporary signal pattern, so as to determine whether the two temporary signal patterns coincide with each other. The pattern processing unit 123 of the power feeding apparatus 100 may or may not change the control signal. Furthermore, the pattern processing unit 223 of the vehicle 200 can change the control signal in a manner based on the shared temporary signal pattern. The pattern processing unit 223 of the vehicle 200 may or may not detect changes in the control signal as a temporary signal pattern, and may or may not determine whether the detected temporary signal pattern coincides with the shared temporary signal pattern.

Figure 8:
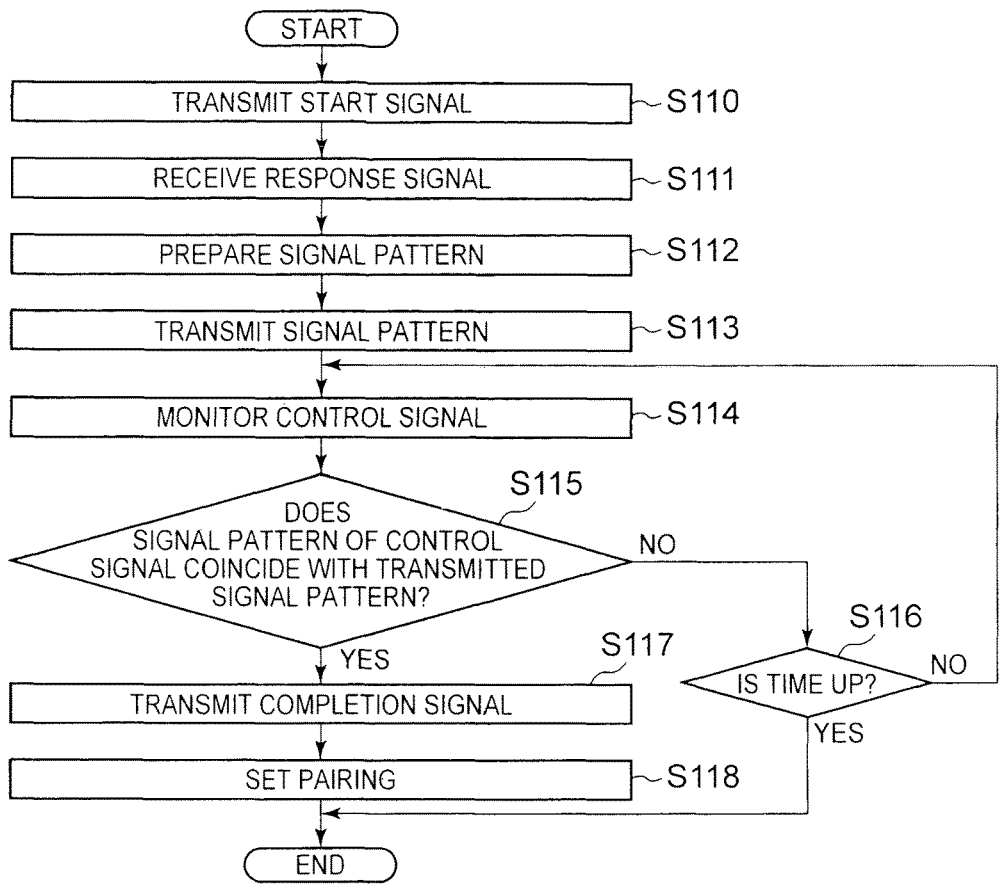
FIG. 8 is a flowchart illustrating a pairing operation of a power feeding apparatus in a charging system according to a second embodiment of the invention.

As shown in FIG. 8, once the pairing operation is started, the power supply unit 120 transmits a start signal indicative of start of the pairing operation, to the vehicle 200, via wireless communication (step S110). Then, the power supply unit 120 receives a response signal corresponding to the start signal, from the vehicle 200, via wireless communication (step S111). Subsequently, the power supply unit 120 prepares a temporary signal pattern to be shared and used for the pairing operation (step S112), and transmits the shared temporary signal pattern thus prepared, to the vehicle 200 (step S113). Then, the power supply unit 120 monitors the control signal, and detects changes in the voltage or duty ratio arising in the control signal, as a temporary signal pattern (step S114), and determines whether the detected temporary signal pattern coincides with the shared temporary signal pattern transmitted to the vehicle 200 (step S115).

When it is determined that the detected temporary signal pattern does not coincide with the shared temporary signal pattern (NO in step S115), the power supply unit 120 determines whether time is up (step S116). If it is determined that time is not up (NO in step S116), the power supply unit 120 returns to step S114, and detects the temporary signal pattern. If, on the other hand, it is determined that time is up (YES in step S116), the power supply unit 20 terminates the pairing operation. Namely, the pairing operation is not accomplished.

If it is determined that the detected temporary signal pattern coincides with the transmitted and shared temporary signal pattern (YES in step S115), the power supply unit 120 transmits a completion signal indicative of completion of the pairing operation, to the vehicle 200, via wireless communication (step S117). Also, the power supply unit 120 establishes completion of the pairing operation (step S119), and finishes the pairing operation.

Figure 9:
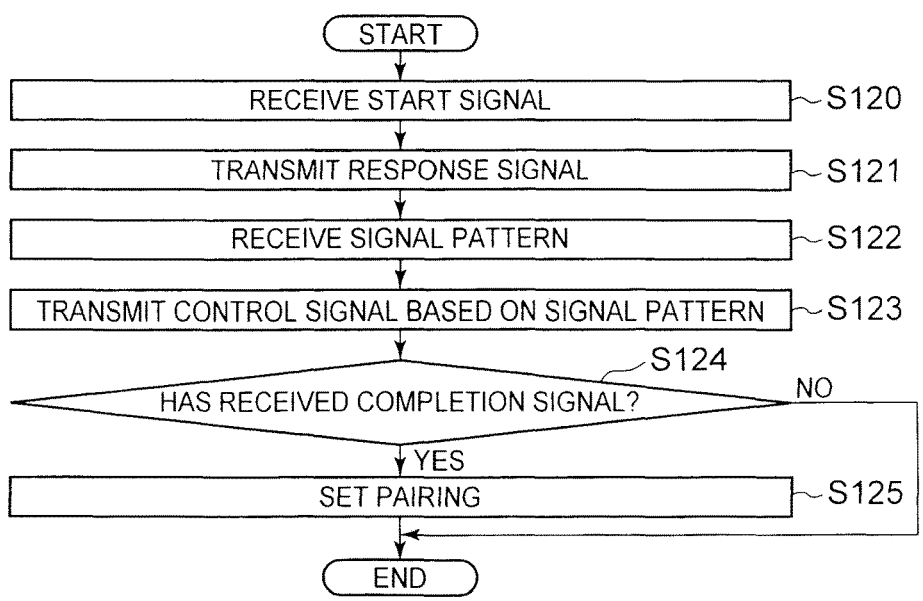
FIG. 9 is a flowchart illustrating a pairing operation of a charging apparatus (vehicle) in the charging system of the second embodiment.

As shown in FIG. 9, once the pairing operation is started, the charging unit 220 receives the start signal indicative of start of the pairing operation, from the power feeding apparatus 100, via wireless communication (step S120). When the charging unit 220 does not receive the start signal, it may wait in a condition where it can receive the start signal, until a given time elapses or a given condition is satisfied. Then, the charging unit 220 transmits the response signal corresponding to the start signal, to the power feeding apparatus 100, via wireless communication (step S121).

Then, the charging unit 220 receives the shared temporary signal pattern from the power feeding apparatus 100, via wireless communication (step S122), and changes the voltage of the control signal line L4 based on the shared temporary signal pattern thus received (step S123).

Then, the charging unit 220 determines whether it has received the completion signal indicative of completion of the pairing operation, from the power feeding apparatus 100, via wireless communication (step S124). If the completion signal is not received, the charging unit 220 may wait in a condition where it can receive the completion signal, until a given time elapses or a given condition is satisfied. If it is determined that the completion signal is received (YES in step S124), the charging unit 220 establishes completion of the pairing operation (step S125), and finishes the pairing operation. If, on the other hand, it is determined that the completion signal is not received (NO in step S124), the charging unit 220 terminates the pairing operation. Namely, the pairing operation is not accomplished.

The operation of this embodiment will be described based on the behaviors of the power feeding apparatus 100 (power supply unit 120) and the vehicle 200 (charging unit 220). As shown in FIG. 10, each of the power feeding apparatus 100 and the vehicle 200 starts its pairing operation, upon detection of connection between the power-feed-side connector 126 and the inlet 226 (steps S130, S140).

Initially, the power feeding apparatus 100 transmits a start signal M130 to the vehicle 200 via wireless communication (step S131). The vehicle 200 receives the start signal M130 via wireless communication (step S141), and transmits a response signal M140 corresponding to the received start signal M130, to the power feeding apparatus 100, via wireless communication (step S142). If the power feeding apparatus 100 receives the response signal M140 via wireless communication (step S132), it transmits a temporary signal pattern M131 to be shared and used for pairing, to the vehicle 200, via wireless communication (step S133).

If the vehicle 200 receives the shared temporary signal pattern M131 via wireless communication (step S143), it adjusts the control signal so as to change the voltage of the control signal with a pattern corresponding to the shared temporary signal pattern (step S144). As a result, the control signal M141 having the shared temporary signal pattern is transmitted to the power feeding apparatus 100 via the control signal line L4. The power feeding apparatus 100 receives the control signal M141 having the shared temporary signal pattern (step S134), and detects the temporary signal pattern from the control signal M141 (step S135). Also, the power feeding apparatus 100 compares the detected temporary signal pattern with the shared temporary signal pattern transmitted thereto, and determines whether these two temporary signal patterns coincide with each other (or not). Then, if the power feeding apparatus 100 determines that these two temporary signal patterns coincide with each other, it transmits a completion signal to the vehicle 200 (step S138), and establishes completion of pairing (step S139). Also, the vehicle 200 receives the completion signal M132 transmitted from the power feeding apparatus 100 via wireless communication (step S145), and establishes completion of pairing (step S146). If setting of pairing is completed in both of the power feeding apparatus 100 and the vehicle 200 in this manner, the power feeding apparatus 100 and the vehicle 200 can start high-level wireless communications (steps S139A, S147). Through the high-level wireless communications, the power feeding apparatus 100 and the vehicle 200 can send and receive various types of information, including information useful for charging, such as the state of the storage battery 240, to and from each other as needed. Consequently, highly-functional charge control can be performed based on the information.

As described above, the charging system according to this embodiment provides the following effects, in addition to the effects (1), (2) as described above with respect to the first embodiment. (6) While the use of the control signal is fixed or determined in advance, it is possible to transmit a shared temporary signal pattern via the control signal, by changing the voltage of the control signal.

(7) The control signal can be changed by the vehicle 200. Also, the result of determination by the power feeding apparatus 100 that the above-indicated two temporary signal patterns coincide with each other can be utilized by the power feeding apparatus 100 and the vehicle 200.

(8) With the shared signal pattern stored in the power feeding apparatus 100, it is possible for the vehicle 200 to specify the power feeding apparatus 100 based on the shared signal pattern.

A charging system according to a third embodiment of the invention will be described with reference to FIG. 11 to FIG. 13. This embodiment is different from the first embodiment in that the power feeding apparatus 100 detects changes in the amount of electric power produced when the vehicle 200 adjusts the control signal based on the shared temporary signal pattern, as a temporary signal pattern, based on which a pairing operation is performed. However, the configurations of the power feeding apparatus 100 and the vehicle 200 are substantially the same as those of the first embodiment, and therefore, will not be described for the sake of convenience.

In this embodiment, the shared temporary signal pattern is stored in advance in the power-feed-side storage unit 160. Also, the power feeding apparatus 100 detects a temporary signal pattern, based on changes in the amount of electric power delivered to the power lines L1, L2. In this embodiment, while the pairing operation is started when the power feeding apparatus 100 and the vehicle 200 are connected by the power feed line, electric power for charging is delivered from the power feeding apparatus 100 to the power lines L1, L2 immediately after this operation is started.

As shown in FIG. 11, once the pairing operation is started, the power supply unit 120 receives a start signal indicative of start of the pairing operation, from the vehicle 200, via wireless communication (step S210). If the start signal is not received, the power supply unit 120 may wait in a condition where it can receive the start signal, until a given time elapses or a given condition is satisfied. Then, the power supply unit 120 prepares a temporary signal pattern to be shared and used for the pairing operation (step S211), and transmits the shared temporary signal pattern thus prepared, to the vehicle 200 (step S212).

Subsequently, the power supply unit 120 supplies the amount of electric power according to the adjustment of the control signal transmitted from the vehicle 200 via the control signal line L4 (step S213). Also, the power supply unit 120 monitors the electric power, and detects changes in the amount of the electric power thus monitored, as a temporary signal pattern (step S214). The temporary signal pattern detected from the electric power is produced in accordance with the shared temporary signal pattern included in the control signal. The power supply unit 120 determines whether the detected temporary signal pattern coincides with the shared temporary signal pattern transmitted to the vehicle 200 (step S215). If it is determined that the detected temporary signal pattern does not coincide with the shared temporary signal pattern (NO in step S215), the power supply unit 120 determines whether time is up (step S216). If it is determined that time is not up (NO in step S216), the power supply unit 120 returns to step S214, to detect the temporary signal pattern. If, on the other hand, it is determined that time is up (YES in step S216), the power supply unit 120 terminates the pairing operation. Namely, the pairing operation is not accomplished.

If it is determined that the detected temporary signal pattern coincides with the shared temporary signal pattern (YES in step S215), the power supply unit 120 transmits a completion signal indicative of completion of the pairing operation, to the vehicle 200, via wireless communication (step S217). Also, the power supply unit 120 establishes completion of the pairing operation (step S218), and finishes the pairing operation.

As shown in FIG. 12, the charging unit 220 starts charging once the pairing operation is started (step S220). Upon start of charging, the charging unit 220 transmits the start signal indicative of start of the pairing operation, to the power feeding apparatus 100, via wireless communication (step S221).

Then, the charging unit 220 receives the shared temporary signal pattern from the power feeding apparatus 100 via wireless communication (step S222), and adjusts the control signal indicative of the amount of electric power and transmitted via the control signal line L4, based on the shared temporary signal pattern thus received (step S223).

Subsequently, the charging unit 220 determines whether it has received the completion signal indicative of completion of the pairing operation, from the power feeding apparatus 100, via wireless communication (step S224). If the completion signal is not received, the charging unit 220 may wait in a condition where it can receive the completion signal, until a given time elapses or a given condition is satisfied. Then, if it is determined that the completion signal is received (YES in step S224), the charging unit 220 establishes completion of the pairing operation (step S225), and finishes the pairing operation. If it is determined that no completion signal is received (NO in step S224), the charging unit 220 terminates the pairing operation. Namely, the pairing operation is not accomplished.

The operation of this embodiment will be described based on the behaviors of the power feeding apparatus 100 (power supply unit 120) and the vehicle 200 (charging unit 220). As shown in FIG. 13, when the vehicle 200 determines that charging is started (step S240), it transmits a start signal M240 for starting a pairing operation, to the power feeding apparatus 100, via wireless communication (step S241). In this connection, once the power feeding apparatus 100 and the vehicle 200 are normally connected by the power feed line, the storage battery 240 of the vehicle 200 starts being charged with electric power from the power feeding apparatus 100. When the power feeding apparatus 100 receives the start signal M240 via wireless communication (step S230), it transmits a temporary signal pattern M230 to be shared and used for pairing, to the vehicle 200, via wireless communication, in response to the start signal M240 (step S231).

If the vehicle 200 receives the shared temporary signal pattern M230 via wireless communication (step S242), it adjusts the control signal so as to change the amount of electric power delivered from the power feeding apparatus 100, based on the shared temporary signal pattern (step S243). As a result, the control signal M241 that causes changes in the amount of electric power based on the shared temporary signal pattern is transmitted to the power feeding apparatus 100 via the control signal line L4, and the amount of the output electric power of the power feeding apparatus 100 is controlled, i.e., changed, based on the shared temporary signal pattern (step S232).

The power feeding apparatus 100 monitors the amount of the output electric power (step S233), and detects a temporary signal pattern from the monitored amount of electric power (step S234). Then, the power feeding apparatus 100 compares the detected temporary signal pattern with the shared temporary signal pattern transmitted to the vehicle 200, and determines whether these temporary signal patterns coincide with each other (step S235). Then, if the power feeding apparatus 100 determines that these two temporary signal patterns coincide with each other (step S236), it transmits a completion signal M231 to the vehicle 200 (step S237), and establishes completion of pairing (step S238).

The vehicle 200 receives the completion signal M231 transmitted from the power feeding apparatus 100 via wireless communication (step S244), and establishes completion of pairing (step S245). Thus, if setting of pairing is completed in both of the power feeding apparatus 100 and the vehicle 200, high-level wireless communications can be started between the power feeding apparatus 100 and the vehicle 200 (steps S239, S246). Through the high-level wireless communications, the power feeding apparatus 100 and the vehicle 200 can send and receive various types of information, including information useful for charging, such as the state of the storage battery 240, to and from each other as needed. Consequently, highly-functional charge control can be performed based on the information.

As described above, the charging system according to this embodiment provides the following effects, in addition to the above-described effects (1), (2) and (6) to (8) as described above with respect to the first and second embodiments.

(9) The vehicle 200 changes the control signal based on the shared temporary signal pattern, so that the shared temporary signal pattern is included in the electric power delivered from the power feeding apparatus 100, and the power feeding apparatus 100 can detect the temporary signal pattern given to the control signal via the electric power. In this manner, the temporary signal pattern detected via the electric power controlled using the control signal can be compared with the shared temporary signal pattern.

(10) Since the charging operation and the pairing operation are executed in parallel or concurrently, there is no possibility of prolonging the time required for charging.

A charging system according to a fourth embodiment of the invention will be described with reference to FIG. 14 to FIG. 16. This embodiment is different from the first embodiment in that the power feeding apparatus 100 detects changes in the amount of electric power produced when the vehicle 200 adjusts the control signal based on the shared temporary signal pattern, as a temporary signal pattern, based on which a pairing operation is performed. However, the configurations of the power feeding apparatus 100 and the vehicle 200 are substantially the same as those of the first embodiment, and therefore, will not be described for the sake of convenience.

In this embodiment, the shared temporary signal pattern is stored in advance in the in-vehicle storage unit 260. Also, the power feeding apparatus 100 detects a temporary signal pattern, based on changes in the amount of electric power delivered to the power lines L1, L2. In this embodiment, while the pairing operation is started when the power feeding apparatus 100 and the vehicle 200 are connected by the power feed line, electric power for charging is delivered from the power feeding apparatus 100 to the power lines L1, L2 immediately after this operation is started.

Figure 14:
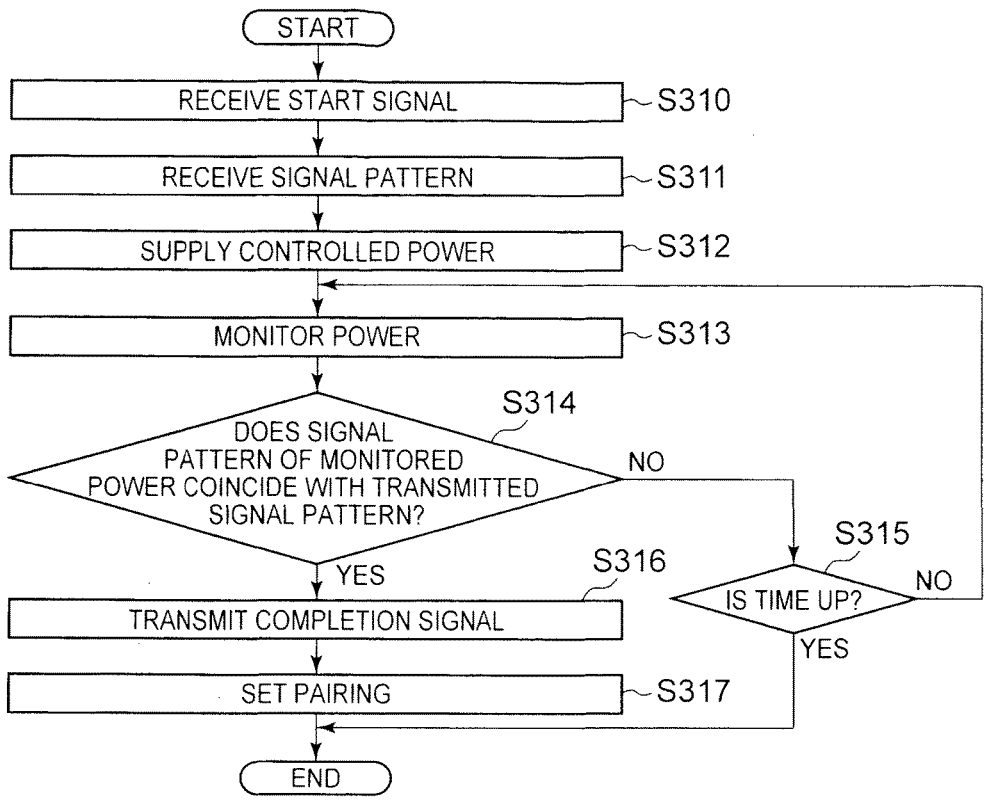
FIG. 14 is a flowchart illustrating a pairing operation of a power feeding apparatus in a charging system according to a fourth embodiment of the invention.

As shown in FIG. 14, once the pairing operation is started, the power supply unit 120 receives a start signal indicative of start of the pairing operation from the vehicle 200 via wireless communication (step S310). When the start signal is not received, the power supply unit 120 may wait in a condition where it can receive the start signal, until a given time elapses or a given condition is satisfied. Then, the power supply unit 120 receives a temporary signal pattern to be shared and used for the pairing operation, from the vehicle 200, via wireless communication (step S311).

Subsequently, the power supply unit 120 supplies electric power whose amount is controlled according to the control signal transmitted from the vehicle 200 via the control signal line L4 (step S312). Also, the power supply unit 120 monitors the electric power, and detects changes in the amount of the monitored electric power, as a temporary signal pattern (step S313). The temporary signal pattern detected from the electric power is produced in accordance with the shared temporary signal pattern included in the control signal. The power supply unit 120 determines whether the detected temporary signal pattern coincides with the shared temporary signal pattern received by the power supply unit 120 (step S314).

If it is determined that the detected temporary signal pattern does not coincide with the shared temporary signal pattern received by the power supply unit 120 (NO in step S314), the power supply unit 120 determines whether time is up (step S315). If it is determined that time is not up (NO in step S315), the power supply unit 120 returns to step S313, and detects the temporary signal pattern. If, on the other hand, it is determined that time is up (YES in step S315), the power supply unit 120 terminates the pairing operation. Namely, the pairing operation is not accomplished.

If it is determined that the detected temporary signal pattern coincides with the shared temporary signal pattern (YES in step S314), the power supply unit 120 transmits a completion signal indicative of completion of the pairing operation, to the vehicle 200, via wireless communication (step S316). Also, the power supply unit 120 establishes completion of the pairing operation (step S317), and finishes the pairing operation.

Figure 15:
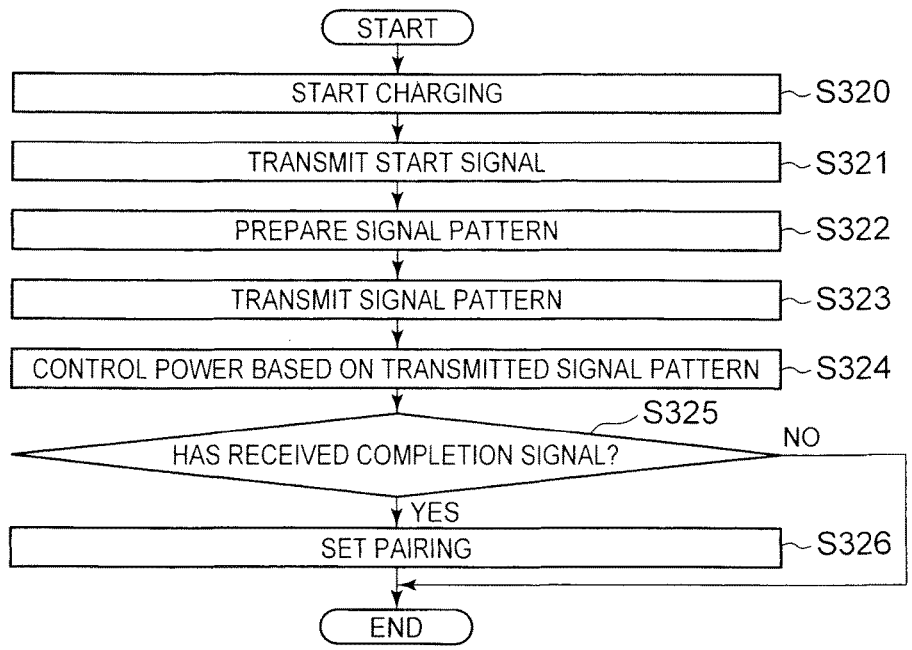
FIG. 15 is a flowchart illustrating a pairing operation of a charging apparatus (vehicle) in the charging system of the fourth embodiment.

As shown in FIG. 15, once the pairing operation is started, and charging is started (step S320), the charging unit 220 transmits the start signal indicative of start of the pairing operation, to the power feeding apparatus 100, via wireless communication (step S321).

Then, the charging unit 220 prepares a temporary signal pattern to be shared and used for the pairing operation (step S322), and transmits the shared temporary signal pattern thus prepared, to the power feeding apparatus 100 (step S323). Then, the charging unit 220 adjusts the control signal indicative of the amount of electric power and transmitted via the control signal line L4, based on the shared temporary signal pattern thus transmitted (step S324).

Subsequently, the charging unit 220 determines whether it has received the completion signal indicative of completion of the pairing operation, from the power feeding apparatus 100, via wireless communication (step S325). If the completion signal is not received, the charging unit 220 may wait in a condition where it can receive the completion signal, until a given time elapses or a given condition is satisfied. If it is determined that the completion signal is received (YES in step S325), the charging unit 220 establishes completion of the pairing operation (step S326), and finishes the pairing operation. If, on the other hand, it is determined that the completion signal is not received (NO in step S325), the charging unit 220 terminates the pairing operation. Namely, the pairing operation is not accomplished.

The operation of this embodiment will be described based on the behaviors of the power feeding apparatus 100 (power supply unit 120) and the vehicle 200 (charging unit 220). As shown in FIG. 16, when the vehicle 200 determines that charging has started (step S340), it transmits a start signal M340 for starting a pairing operation, to the power feeding apparatus 100, via wireless communication (step S341). In this connection, when the power feeding apparatus 100 and the vehicle 200 are normally connected by the power feed line, the storage battery 240 of the vehicle 200 starts being charged with electric power from the power feeding apparatus 100. The power feeding apparatus 100 receives the start signal M340 via wireless communication (step S330). Subsequently, the vehicle 200 transmits a temporary signal pattern M341 to be shared and used for pairing, to the power feeding apparatus 100, via wireless communication (step S342). The power feeding apparatus 100 receives the shared temporary signal pattern M341 via wireless communication (step S331).

Also, the vehicle 200 adjusts the control signal so as to change the amount of electric power delivered from the power feeding apparatus 100, based on the shared temporary signal pattern transmitted to the apparatus 100 (step S343). The control signal M342 that causes changes in the amount of electric power based on the shared temporary signal pattern is transmitted to the power feeding apparatus 100 via the control signal line L4, and the amount of electric power delivered from the power feeding apparatus 100 is controlled, i.e., changed, based on the shared temporary signal pattern (step S332).

The power feeding apparatus 100 monitors the amount of the output electric power (step S333), and detects a temporary signal pattern from the monitored amount of electric power (step S334). Also, the power feeding apparatus 100 compares the detected temporary signal pattern, with the shared temporary signal pattern received, and determines whether these temporary signal patterns coincide with each other (step S335). Then, if the power feeding apparatus 100 determines that the two temporary signal patterns coincide with each other (step S336), it transmits a completion signal M330 to the vehicle 200 (step S337), and establishes completion of pairing (step S338). Also, the vehicle 200 receives the completion signal M330 transmitted from the power feeding apparatus 100 via wireless communication (step S344), and establishes completion of pairing (step S345).

Once setting of pairing is completed in both of the power feeding apparatus 100 and the vehicle 200, high-level wireless communications can be started between the power feeding apparatus 100 an the vehicle 200 (steps S339, S346).

Through the high-level communications, the power feeding apparatus 100 and the vehicle 200 can send and receive various types of information, including information useful for charging, such as the state of the storage battery 240, to and from each other as needed. Consequently, highly functional charge control can be performed based on the information.

As described above, the charging system according to this embodiment provides the following effects, in addition to the effects (1), (2), (5) to (7), (9), (10) as described above with respect to the first, second and third embodiments. (11) Since no information is transmitted between the power feeding apparatus 100 and the vehicle 200 until the completion signal is obtained from the power feeding apparatus 100, the pairing operation can be easily and promptly performed.

Each of the illustrated embodiments may be implemented in the following manners.

In each of the illustrated embodiments, the power supply unit 120, power-feed-side storage unit 160, and the power-feed-side wireless communication unit 130 are provided in the power feeding apparatus 100. However, the invention is not limited to this arrangement, but a part of the functions of the power supply unit, power-feed-side storage unit, power-feed-side wireless communication unit, etc. may be provided in an information-processing device outside the vehicle, or may be provided in a portable information-processing device. With this arrangement, the flexibility in designing the charging system can be enhanced.

In each of the illustrated embodiments, the charging unit 220, in-vehicle storage unit 260, and the in-vehicle wireless communication unit 270 are installed on the vehicle 200. However, the invention is not limited to this arrangement, but a part of the functions of the charging unit, in-vehicle storage unit, in-vehicle wireless communication unit, etc. may be provided in an information-processing device outside the vehicle, or may be provided in a portable information-processing device. An information processing center, and the like, are listed as examples of the information-processing device outside the vehicle, and a portable phone (cell-phone), smartphone, and the like, are listed as examples of the portable information-processing device. If the above functions are provided in the information-processing device outside the vehicle, information may be communicated via a wireless communication line, or the like. If the above functions are provided in the portable information-processing device, it may be connected to an in-vehicle network, or may be connected via short-distance communications, or information may be communicated via a wireless communication line. Thus, the flexibility in designing the charging system can be enhanced.

In each of the illustrated embodiments, the shared temporary signal pattern is stored in the power-feed-side storage unit 160 and the in-vehicle storage unit 260. However, the invention is not limited to this arrangement, but the shared temporary signal pattern may be stored in the power supply unit and the charging unit. Thus, the flexibility in designing the charging system can be enhanced.

In the first and second embodiments, the apparatus that transmits the shared temporary signal pattern determines whether the temporary signal pattern detected from the control signal coincides with the shared temporary signal pattern transmitted from the apparatus. However, the invention is not limited to this arrangement, but the apparatus that transmits the shared temporary signal pattern may be different from the apparatus that determines whether the temporary signal pattern detected from the control signal coincides with the shared temporary signal pattern. For example, the vehicle may transmit a temporary signal pattern to be shared, and change the control signal with the shared temporary signal pattern, and the power feeding apparatus may determine whether the shared temporary signal pattern received from the vehicle coincides with the temporary signal pattern detected from the control signal. Also, the power feeding apparatus may transmit a temporary signal pattern to be shared, and change the control signal with the shared temporary signal pattern, and the vehicle may determine whether the shared temporary signal pattern received from the power feeding apparatus coincides with the temporary signal pattern detected from the control signal. Thus, the flexibility in designing the charging system can be enhanced.

In each of the illustrated embodiments, changes in the voltage of the control signal are detected as a temporary signal pattern. However, the invention is not limited to this arrangement, but changes in the electric current of the control signal may be detected as a temporary signal pattern. Thus, the flexibility in designing the charging system can be enhanced.

In each of the illustrated embodiments, the storage battery is charged with AC power according to the SAE J1772 standard. However, the invention is not limited to this, but charging may be conducted based on a standard, or the like, other than the SAE J1772 standard, provided that the charging system uses AC power for charging, and does not permit communications via a power feed line when connected. Thus, the range of application of the charging system can be extended.

In each of the illustrated embodiments, the charging system is arranged to charge the storage battery with AC power. However, the invention is not limited to this arrangement, but the electric power with which the storage battery is charged may be DC power, provided that the charging system does not permit communications via the power feed line when connected. Thus, the range of application of the charging system can be extended.

In each of the illustrated embodiments, the power feeding apparatus 100 and the vehicle 200 are connected such that information can be supplied and received via wireless communications between the power-feed-side wireless communication unit 130 and the in-vehicle wireless communication unit 270. However, the invention is not limited to this arrangement, but the power feeding apparatus and the vehicle may be linked by connections including a wired connection, a connection including a public line, and/or a connection including a network, for example. In the charging system of the invention, the power feeding apparatus and the vehicle to which the power feed line is connected can be reliably connected for communications, irrespective of which type of connection is employed. Thus, the flexibility in configuring the vehicle for which the charging system is used can be enhanced.

In each of the illustrated embodiments, the shared temporary signal pattern is stored in advance in the vehicle 200 or the power feeding apparatus 100. However, the invention is not limited to this, but the transmitting side of wireless communications may create a temporary signal pattern to be shared, when a pairing operation needs to be performed.

In each of the illustrated embodiment, the charging apparatus including the charging unit 220, in-vehicle storage unit 260, in-vehicle wireless communication unit 270, etc. is installed on the vehicle 200. However, the invention is not limited to this arrangement, but the charging apparatus may be used in mobile objects, such as a ship, railroad vehicle, robot, and electric appliances, for example, other than vehicles, provided that a storage battery is installed on the object. Thus, the range of application of the charging system can be extended.

The invention claimed is:

1. A charging system comprising:
 a charging apparatus including a power receiving unit that receives electric power with which a storage battery is charged; and
 a power feeding apparatus including a power feeding unit connected to the power receiving unit of the charging apparatus, the power feeding apparatus being configured to supply electric power to the power feeding unit, wherein
 the power feeding unit and the power receiving unit are connected to each other via a power line that transmits electric power, and a control signal line that transmits a control signal for controlling transmission of the electric power;
 the power feeding apparatus and the charging apparatus are configured to transmit the electric power based on control according to the control signal;
 the power feeding apparatus and the charging apparatus include respective communication devices that permit mutual communication between the power feeding apparatus and the charging apparatus, through separate communication channels from those communication channels established by connection between the power feeding unit and the power receiving unit;
 the power feeding apparatus and the charging apparatus are configured to share a first temporary signal pattern to be given to the control signal, based on communication via the communication devices; and
 at least one of the power feeding apparatus and the charging apparatus is configured to determine that the power feeding apparatus and the charging apparatus are connected to each other via the power feeding unit and the power receiving unit while communicating with each other via the respective communication devices, when a second temporary signal pattern detected from the control signal transmitted via the control signal line coincides with the first temporary signal pattern shared based on the communication via the communication devices.

2. The charging system according to claim 1, wherein:
the power feeding apparatus is adapted to supply AC power; and
the control signal controls feeding of the AC power.

3. The charging system according to claim 1, wherein:
one of the power feeding apparatus and the charging apparatus is configured to adjust the control signal by changing a voltage or duty ratio of the control signal; and
the other of the power feeding apparatus and the charging apparatus is configured to detect the second temporary signal pattern of the control signal, from change in the voltage or duty ratio of the control signal.

4. The charging system according to claim 1, wherein:
the first temporary signal pattern is created by the power feeding apparatus; and
when the second temporary signal pattern detected from the control signal coincides with the first temporary signal pattern, the charging apparatus is configured to inform the power feeding apparatus of matching of the second temporary signal pattern with the first temporary signal pattern, through communication via the communication devices.

5. The charging system according to claim 1, wherein:
the first temporary signal pattern is created by the charging apparatus; and
when the second temporary signal pattern detected from the control signal coincides with the first temporary signal pattern, the power feeding apparatus is configured to inform the charging apparatus of matching of the second temporary signal pattern with the first temporary signal pattern, through communication via the communication devices.

6. The charging system according to claim 1, wherein:
the charging apparatus is configured to change energy of electric power delivered from the power feeding apparatus according to the first temporary signal pattern by changing the control signal based on the first temporary signal pattern; and
the power feeding apparatus is configured to detect a third temporary signal pattern in the electric power as a change of the control signal based on the first temporary signal pattern, and compare the third temporary signal pattern with the first temporary signal pattern.

7. The charging system according to claim 6, wherein the first temporary signal pattern is created by the charging apparatus.

8. The charging system according to claim 1, wherein the charging apparatus stores the first temporary signal pattern, and is configured to share the stored first temporary signal pattern with the power feeding apparatus, by communicating with the power feeding apparatus via the communication devices.

9. The charging system according to claim 1, wherein the power feeding apparatus stores the first temporary signal pattern, and is configured to share the stored first temporary signal pattern with the charging apparatus, by communicating with the charging apparatus via the communication devices.

10. The charging system according to claim 1, wherein the communication via the communication devices is wireless communication.

11. A pairing method of associating a charging apparatus with a power feeding apparatus, the charging apparatus including a power receiving unit that receives electric power with which a storage battery is charged, the power feeding apparatus including a power feeding unit connected to the power receiving unit of the charging apparatus and being configured to supply electric power to the power feeding unit, the pairing method comprising:
connecting the power feeding unit and the power receiving unit to each other via a power line that transmits electric power, and a control signal line that transmits a control signal for controlling transmission of the electric power;
establishing mutual communication between the power feeding apparatus and the charging apparatus, via communication devices respectively provided in the power feeding apparatus and the charging apparatus, and sharing a first temporary signal pattern of the control signal between the power feeding apparatus and the charging apparatus through the mutual communication; and
causing at least one of the power feeding apparatus and the charging apparatus to determine that the power feeding apparatus and the charging apparatus are connected to each other via the power feeding unit and the power receiving unit while communicating with each other via the respective communication devices, when a second temporary signal pattern detected from the control signal transmitted via the control signal line is equal to the first temporary signal pattern.

* * * * *